United States Patent
Kurioka

(10) Patent No.: US 7,636,593 B2
(45) Date of Patent: Dec. 22, 2009

(54) RECEIVER

(75) Inventor: Nobuyuki Kurioka, Kobe (JP)

(73) Assignee: Fujitsu Ten Limited, Kobe-Shi, Hyogo (JP)

( * ) Notice: Subject to any disclaimer, the term of this patent is extended or adjusted under 35 U.S.C. 154(b) by 636 days.

(21) Appl. No.: 11/049,795

(22) Filed: Feb. 3, 2005

(65) Prior Publication Data

US 2005/0245224 A1 Nov. 3, 2005

(30) Foreign Application Priority Data

| Feb. 4, 2004 | (JP) | ............................ 2004-028005 |
| Mar. 16, 2004 | (JP) | ............................ 2004-074695 |
| Mar. 18, 2004 | (JP) | ............................ 2004-077962 |

(51) Int. Cl.
H04M 1/00 (2006.01)

(52) U.S. Cl. ................. 455/575.7; 455/137; 455/561.1; 455/562.1; 342/374

(58) Field of Classification Search ......... 342/372–374, 342/367, 457; 455/446, 456, 562.1, 450–453, 455/137, 132, 456.1, 561, 575.1, 575.7
See application file for complete search history.

(56) References Cited

U.S. PATENT DOCUMENTS

| 4,633,519 | A | 12/1986 | Gotoh et al. |
| 5,634,204 | A | 5/1997 | Takahashi et al. |
| 5,903,826 | A * | 5/1999 | Nowak .................... 455/277.1 |
| 6,400,318 | B1 * | 6/2002 | Kasami et al. .............. 342/383 |
| 6,493,545 | B1 | 12/2002 | Sugaya |
| 7,308,285 | B2 * | 12/2007 | Nelson et al. ............ 455/562.1 |
| 2002/0034967 | A1 * | 3/2002 | Taniguchi et al. .......... 455/562 |
| 2003/0053412 | A1 | 3/2003 | Yoshida et al. |

(Continued)

FOREIGN PATENT DOCUMENTS

EP 1 296 466 A2 3/2003

(Continued)

OTHER PUBLICATIONS

European Search Report dated Jan. 10, 2007, for 05250609.4, in the name of Fujitsu Ten Limited.

(Continued)

*Primary Examiner*—Nhan T Le
(74) *Attorney, Agent, or Firm*—Christie, Parker & Hale, LLP

(57) ABSTRACT

A receiver for receiving a digital signal of a radio wave etc. modulated by the OFDM scheme, provided with a first reception unit having a first antenna set comprising a plurality of directional antennas, a first switching/combining unit for outputting a signal received at one directional antenna of said first antenna set or a combined signal of signals received by at least two directional antennas in the first antenna set; a second reception unit having a second antenna set comprising a plurality of directional antennas, a second switching/combining unit for outputting a signal received at one directional antenna of the second antenna set or a combined signal of signals received by at least two directional antennas in the second antenna set; and a switching/combining control unit for controlling the switching/combining operation of the reception signals of the first switching/combining unit and/or the second switching/combining unit based on the states of reception in the first reception unit and the second reception unit.

7 Claims, 34 Drawing Sheets

U.S. PATENT DOCUMENTS

2003/0181222 A1* 9/2003 Raddant .................. 455/562.1

FOREIGN PATENT DOCUMENTS

| EP | 1 296 466 A3 | 8/2003 |
|---|---|---|
| JP | 59-074708 | 4/1984 |
| JP | 61-230503 | 10/1986 |
| JP | 01-120107 | 5/1989 |
| JP | 05-091003 | 4/1993 |
| JP | 05-259950 | 10/1993 |
| JP | 06-315022 | 11/1994 |
| JP | 11-122152 | 4/1999 |
| JP | 2003-87213 | 3/2003 |
| JP | 2003-283399 | 10/2003 |
| JP | 2003-283405 | 10/2003 |
| JP | 2006-33056 | 2/2006 |
| KR | 2000-0023201 | 4/2000 |

OTHER PUBLICATIONS

European Search report dated Aug. 29, 2006, for 05250609.4, in the name of Fujitsu Ten Limited.

Patent Abstracts of Japan, Publication No. 2006033056, dated Feb. 2, 2006, in the name of Nobuyuki Kurioka.

Patent Abstracts of Japan, Publication No. 05-259950, dated Oct. 8, 1993, and English Machine translation.

Japanese Office action dated Apr. 30, 2009, for priority Japanese application 2004-028005, noting listed reference in this IDS, as well as JP 2003-283405 previously filed in an IDS dated Feb. 2, 2007.

* cited by examiner

STRONG FIELD

STRONG FIELD REGION

STRONG FIELD REGION

STRONG FIELD REGION

STRONG FIELD REGION

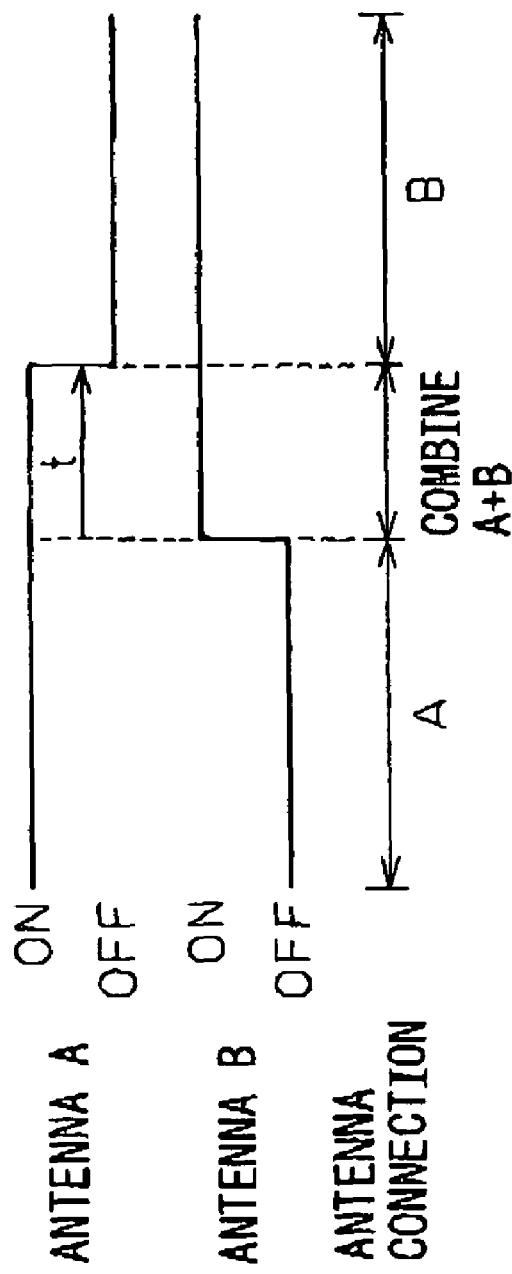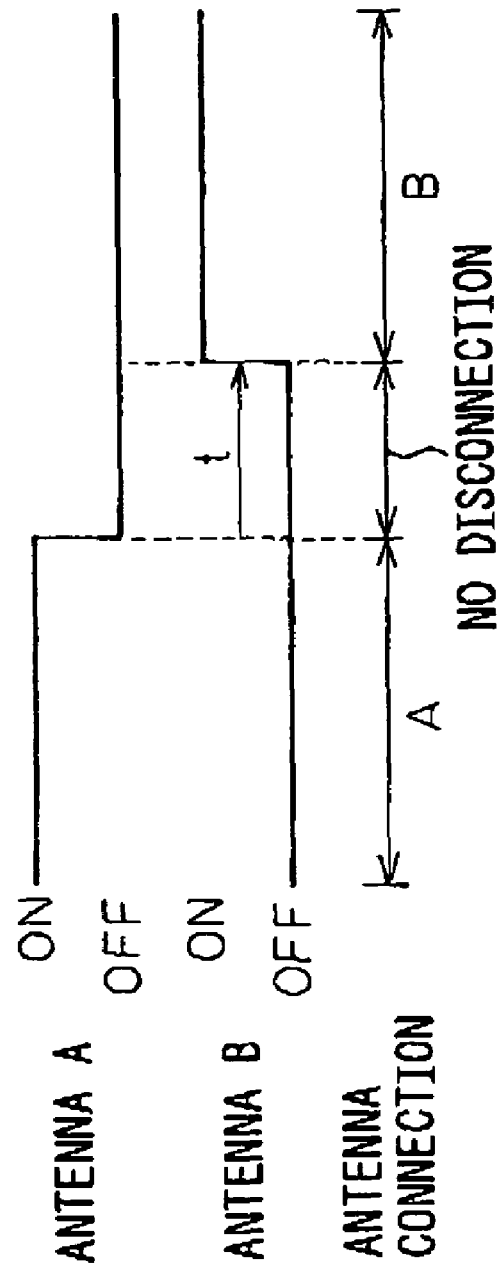

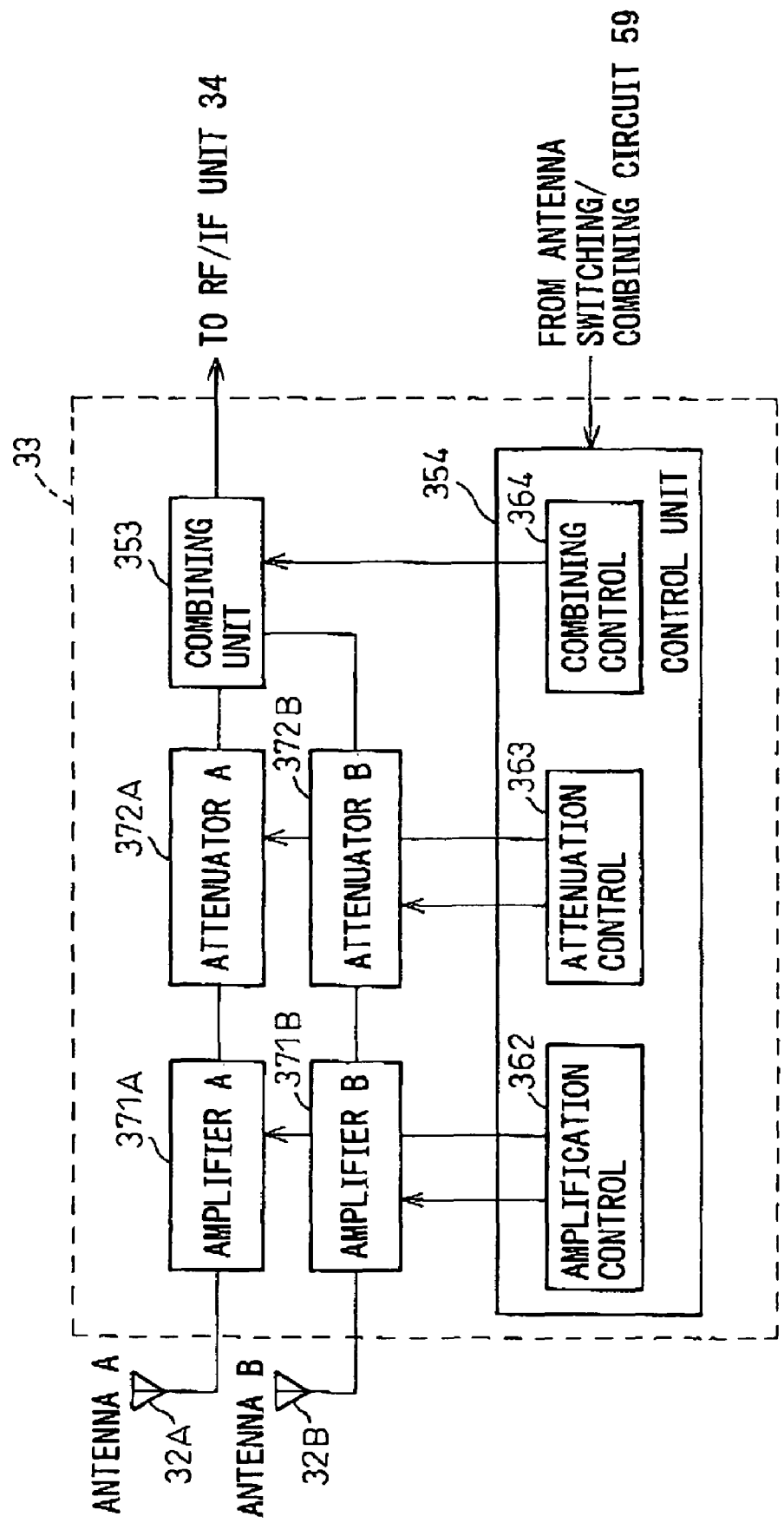

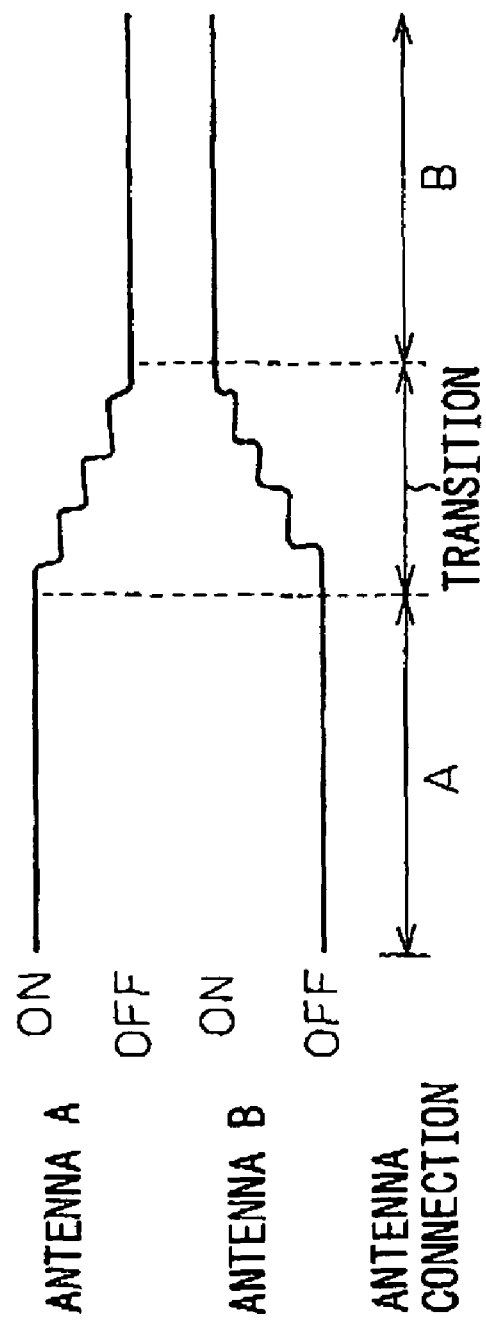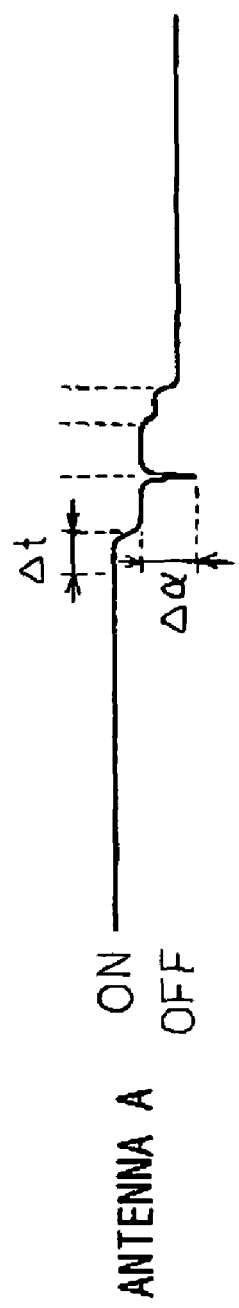
Fig.35A
Fig.35B

RECEIVER

This application claims priority to Japanese Patent Application No. JP-2004-028005 filed on Feb. 4, 2004 which claims priority to JP-2004-074695 filed Mar. 16, 2004 which claims priority to JP-2004-077962 filed on Mar. 18, 2004.

BACKGROUND OF THE INVENTION

1. Field of the Invention

The present invention relates to a receiver, more particularly relates to a receiver for receiving a digital signal such as a radio wave modulated by the orthogonal frequency division multiplexing (OFDM) scheme.

2. Description of the Related Art

The OFDM scheme is used for ground wave digital television broadcasting. The OFDM scheme is a type of a multi-carrier transmission system and transmits a signal obtained by quadrature amplitude modulation (QAM) of 5300 sub-carriers arranged at intervals of for example 1 kHz.

The multi-carrier system is known as a system generally excellent in durability with respect to frequency selective phasing. Frequency selective phasing causes a problem in that it degrades the line quality in broadband wireless communication. In the ground wave digital television broadcasting, it is necessary to transmit high quality images, so the OFDM scheme is employed in the about 500 MHz to 800 MHz frequency band.

In the OFDM scheme, the frequency bands of the modulated waves are superimposed on each other between adjacent sub-carriers, but the orthogonality of the modulated wave band signals, that is, the zero correlation, is utilized for block modulation/demodulation using a Fast Fourier Transform (FFT). Further, by adding a guard interval signal on the transmission side, inter-symbol interference (ISI) due to the multipath delay is eliminated.

FIG. 1 shows an example of the configuration of a conventional OFDM receiver mounted in a vehicle. Further, FIG. 2 shows an example of a procedure for switching between the directional antennas of FIG. 1. In FIG. 1, an OFDM receiver 11 receives a radio wave modulated by the OFDM scheme. The antenna unit is configured by a front beam antenna 12A having a directivity giving a high gain in the front of the vehicle, a rear beam antenna 12B having a directivity giving a high gain in the rear direction opposite to that, and a switch 13 for selecting one of these directivities.

A demodulation unit is configured by an RF/IF unit 14, an OFDM demodulation unit 15, a level detection unit 16, an error correction unit 17, and an AGC unit 18. Here, the RF/IF unit 14 amplifies the received RF signal, converts the result to the intermediate frequency, and further amplifies the same. The OFDM demodulation unit 15 for demodulating the signal of the intermediate frequency includes the level detection unit 16 and the error correction unit 17 and demodulates and outputs the valid symbols (TS). The level detection unit 16 outputs the reception power information and adjusts the gain of the RF/IF unit 14 via the AGC unit 18.

The error correction unit 17 utilizes the error correction information included in the demodulated signal to detect error and correct it to the possible extent and outputs information of the error rate (BER: Bit Error Rate). The antenna selection circuit 19 controls the switch 13 to select the suitable directional antenna 12A or 12B based on the reception power information and error rate information.

FIG. 2 shows an example of the procedure for switching between the directional antennas in a antenna selection circuit 19 of the OFDM receiver 10 of FIG. 1. At step S11, the circuit monitors if the reception error rate becomes larger than a predetermined reference value. Here, the fact of the reception error rate becoming larger than the predetermined reference value is made the condition for starting antenna switching control for the switch 13.

When the reception error rate is smaller than the predetermined reference value, error correction is possible or the effect of the error is small in range, therefore it is not necessary to switch the directivity of the antenna unit. If the reception error rate becomes larger than the predetermined reference value (Yes of S11), first the front beam antenna 12A side is switched to for a predetermined period (several hundreds of milliseconds) and the mean reception level thereof is found (S12).

Next, the rear beam antenna 12B side is switched to for a predetermined period (several hundreds of milliseconds) and the mean reception level thereof is found (S13). Then, these mean reception levels are compared (S14), then the antenna of the side where the reception level is higher is selected and that state is maintained for a constant time (several seconds to several tens of seconds) (S15). After the elapse of the constant time, the above operation is repeated (S11 to 15).

In this way, conventionally, the practice had been to successively switch to a plurality of antennas having different directivities for predetermined periods to detect their mean reception levels and compare them to select the suitable directional antenna. Due to this, the effect due to multipath phasing and Doppler shift when a moving vehicle received a digital television broadcast signal was reduced (see FIGS. 1 and 2 of Japanese Unexamined Patent Publication (Kokai) No. 2003-283405).

Especially, due to Doppler shift, when a high speed moving vehicle receives a digital television signal modulated by the OFDM scheme, if there is frequency selectivity in the multipath, the reception property will be degraded due to inter-carrier interference (ICI). For this reason, the practice has been to mount a plurality of directional antennas having different directivities on the vehicle and switch the antenna directivity so as to reduce the effect of the inter-carrier interference in a multipath environment (see Japanese Unexamined Patent Publication (Kokai) No. 2003-087213).

Note that, separate from the configuration of FIG. 1, even when providing the OFDM receiver with two systems of antenna means and OFDM demodulating means for reception by the frequency division diversity scheme, the same approach using a switching procedure as in FIG. 2 can be applied (see Japanese Unexamined Patent Publication (Kokai) No. 2003-283405).

If, however, like in above conventional examples, employing the routine of successively switching to a plurality of directional antennas for predetermined periods to detect mean reception levels and comparing these to select the antenna having the best orientation, when for example a vehicle moving at a high speed on streets surrounded by high-rise buildings switches to the desired directional antenna based on the results of the comparison, there would be the problems that the reception environment of the radio wave would already be changing and therefore the state of reception of the vehicle might not be improved or might even be degraded.

Especially, when receiving a digital television signal, there has been the problem that not only does reception deteriorate like with an analog television signal, but also loss of synchronization etc. can lead to reception suddenly being disabled. Further, according to the example of FIG. 2 (S15), there has been the problem that this poor state of reception has to be endured for a certain time (several seconds to several tens of seconds).

Further, with a reception antenna switching scheme, like in the above conventional examples, of successively switching to a plurality of directional antennas for predetermined periods to detect the mean reception levels and comparing them to select the antenna having the best orientation, sometimes a directional antenna having an excessive reception level is selected. As a result, there has been the problem that reception was degraded or reception was disabled.

FIG. 3 shows an example of the settings for switching directional antennas in the prior art. In this example, a broadcast radio wave of a digital television broadcast signal (OFDM signal) is transmitted from a radio tower 201. Further, a vehicle 202 is provided with a front beam antenna 203 facing the direction of advance and a rear beam antenna 204 facing the opposite direction. In this example, the vehicle 202 has entered the strong field of the radio wave transmitted from the radio tower 201. According to the conventional method of switching of directional antennas explained above, the front beam antenna 203 facing the direction of arrival of the radio wave is selected.

In this case, the combination of the strong field of the radio wave and the directional antenna 203 facing the direction of arrival of that radio wave results in the reception level of the radio wave becoming excessive. There was therefore the problem that this excessive reception level exceeded the permissible operating ranges of the amplifier, attenuator, etc. of the reception tuner mounted in the vehicle 202 and caused waveform distortion, harmonic noise, etc., and rather caused deterioration of the reception property of the digital television broadcast signal.

Further, if just, like in the above conventional example, successively switching to a plurality of directional antennas for predetermined periods to detect their mean reception levels and comparing them to simply switch to the antenna having the best orientation, there has been the problem that the reception level greatly fluctuates before and after switching the antenna.

FIG. 4A and FIG. 4B show an example of the configuration of a conventional switch 13. FIG. 4A shows an example of the circuit configuration of the switch 13, while FIG. 4B shows an example of the operation timing thereof. In FIG. 4A, one of the reception signals from the front beam antenna 12A (antenna A) and the rear beam antenna 12B (antenna B) is input to the RF/IF unit 14 via a switch 351 or 352 selected by a control circuit 354. As shown in FIG. 4B, the switches 351 and 352 are simultaneously switched by the control unit 354. In this example, the antenna A is switched from on (connection) to off (disconnection), while the antenna B is switched from off (disconnection) to on (connection) simultaneously.

In such a conventional configuration, the AGC circuit 18 can not track the fluctuations in level before and after the switching, so an impulse noise is generated due to the filter transition response of the later RF/IF unit 14. Further, there has been the problem that a delay arose until the reception level was stabilized, therefore a sharp change of level of the reception signal occurred and exceeded the permissible difference of sampling of the next stage A/D converter etc. causing deterioration of the state of reception and consequently causing bit error.

SUMMARY OF THE INVENTION

In consideration with the above problems, a first object of the present invention is to provide a receiver for detecting and comparing the states of reception of a plurality of directional antennas in a block at the same timing and immediately switching to the desired directional antenna based on the result of comparison.

Further, a second object of the present invention is to provide a receiver for acquiring a reception power at the time of detecting deterioration of the state of reception and switching to a directional antenna having a smaller reception level than an excessively large reception power.

Further, a third object of the present invention is to provide a receiver provided with means for suppressing fluctuation of the reception level before and after switching of an antenna in the receiver and reducing the effect of antenna switching on the receiver.

To attain the first object, according to the present invention, there is provided a receiver for receiving a radio wave modulated by a digital signal, provided with: a first reception unit having a first switching/combining unit receiving as its input a plurality of reception signals and outputting one reception signal or a combined signal of two or more of the plurality of reception signals; a second reception unit having a second switching/combining unit receiving as its input a plurality of reception signals different from said above plurality of reception signals and outputting one reception signal or a combined signal of two or more of the plurality of reception signals; and a switching/combining control unit for controlling the switching/combining operation of the reception signals of said first switching/combining unit and/or said second switching/combining unit based on the states of reception in said first reception unit and said second reception unit.

According to the present invention, the states of reception of a plurality of directional antennas are simultaneously detected and compared in a block, therefore no time lag occurs from the detection of the radio wave to the switching of the antenna, and the optimum directional antenna at the time of the detection is always selected. As a result, the situation of reception of a digital television signal becoming disabled at the time of switching antennas no longer occurs, and a good state of reception is maintained even while moving at a high speed.

Further, to attain the second object, according to the present invention, there is provided a receiver for receiving a radio wave modulated by a digital signal having a selection unit for selecting at least one reception signal among a plurality of reception signals and a control unit for controlling the selection unit based on the state of reception of the reception signal selected by the selection unit, where said control unit selects the reception signal having a reception level not more than a predetermined reference value when the state of reception is degraded.

According to the present invention, at the time of deterioration of reception due to excessive reception power, the directional antennas can be switched to improve the reception performance. In this way, by suitably controlling the reception power of the radio wave at the stage of the antenna input, it becomes possible to provide improved reception performance by using just the range of good characteristics of the reception tuner and other electric circuits in a strong field.

Further, to attain the third object, according to the present invention, there is provided a receiver for receiving a radio wave modulated by a digital signal, provided with: a selection unit receiving as input a plurality of reception signals and selecting at least one reception signal; and an adjustment unit for adjusting the selection and switching timing of said reception signals.

According to the present invention, fluctuation of the reception level before and after the switching of antennas is suppressed, so the degradation of the state of reception due to the switching of antennas is prevented, and it becomes possible to maintain a good state of reception.

BRIEF DESCRIPTION OF THE DRAWINGS

These and other objects and features of the present invention will become clearer from the following description of the preferred embodiments given with reference to the attached drawings, wherein:

FIG. 30A is a diagram showing an example (1) of a switch operation of FIG. 29;

FIG. 30B is a diagram showing an example (2) of a switch operation of FIG. 29;

FIG. 33 is a diagram showing a 16th embodiment of the present invention;

FIG. 35A is a diagram showing an example of operation (1) of FIG. 34A;

FIG. 35B is a diagram showing an example of operation (2) of FIG. 34A;

DESCRIPTION OF THE PREFERRED EMBODIMENTS

Below, first, an explanation will be given of embodiments for achieving the first object of the present invention.

Figure 5:
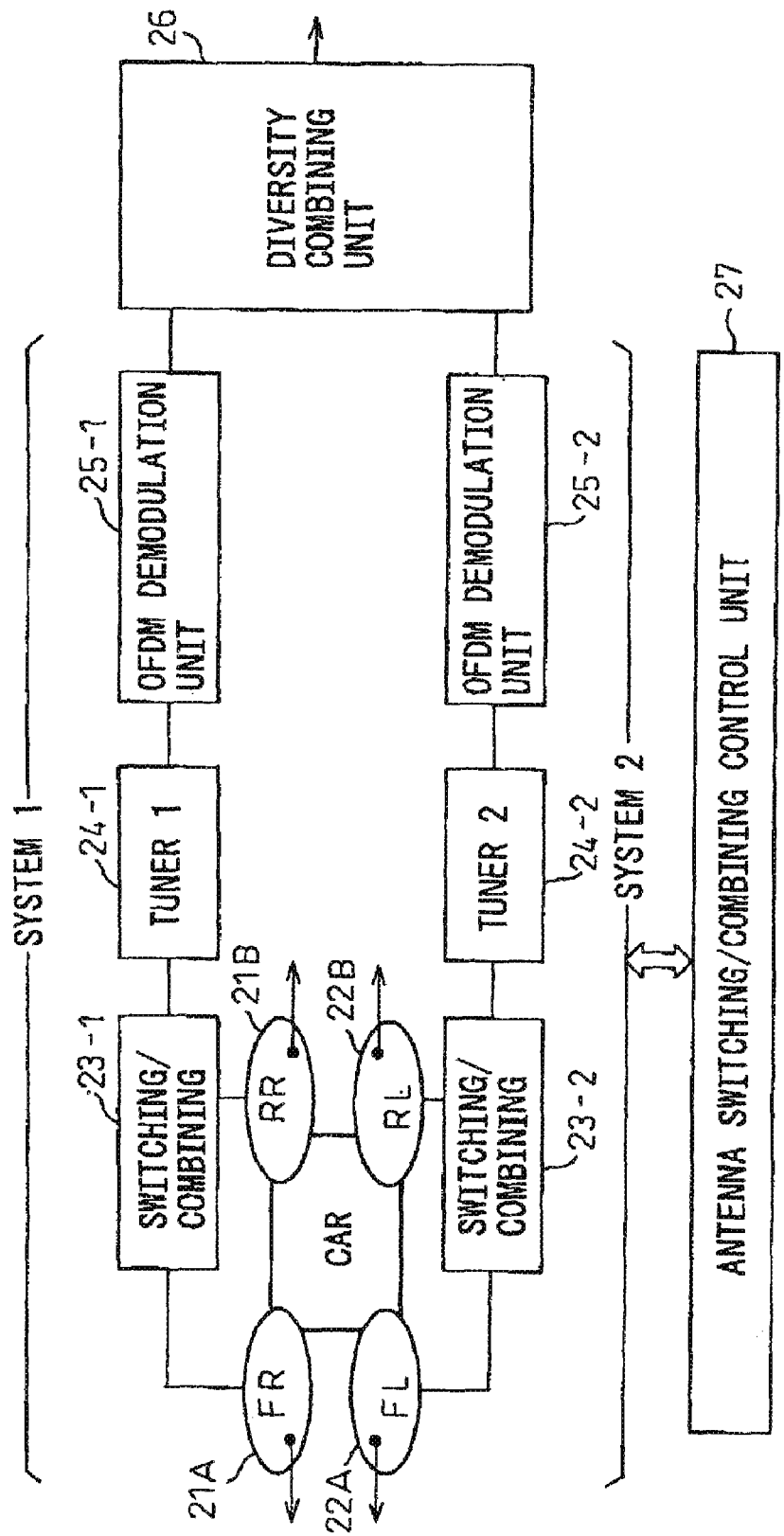
FIG. 5 is a diagram of the basic configuration of an OFDM receiver according to the present invention.

FIG. 5 shows the basic configuration of an OFDM receiver according to the embodiments of the present invention. An OFDM receiver 20 of FIG. 5 is configured by two systems of antenna means and OFDM demodulating means operating independently from each other, a diversity combining unit shared by them, and an antenna switching/combining control unit for controlling the switching/combining operation of the antennas. In the following explanation, the system 1 will be mainly explained, but the same explanation is also true for the system 2.

The antenna means of the system 1 is configured by a front beam antenna (FR) 21A and a rear beam antenna (RR) 21B mounted on the right side of the vehicle and a switching/combining unit 23-1 for switching to either of the reception signal of the antenna 21A or 21B and outputting the same or outputting a combined signal thereof. By such a combination of antennas, an antenna characteristic suited to the vehicle situation such as "nondirectivity (combining of front and rear)" or "directivity (selection of front or rear)" is realized.

A tuner 1 (24-1) amplifies a wireless signal (RF signal) from the switching/combining unit 23-1 and converts the same to an intermediate frequency signal (IF signal). Here, a level detection unit for outputting reception power information and an AGC unit for adjusting a gain of the RF/IF can be included. An OFDM demodulation unit 25-1 demodulates and outputs the valid symbols (TS) for each sub-carrier from the intermediate frequency signal. Here, a level detection unit for outputting reception power information and an AGC unit for adjusting the gain of the RF/IF can be included instead of the tuner 1 side. The diversity combining unit 26 processes each of sub-carriers from the OFDM demodulation units 25-1 and 25-2 of the systems 1 and 2 for frequency division diversity to reduce the inter-carrier interference (ICI). Here, an error correction unit for detecting the error included in the demodulated signal, correcting it to the possible extent, and outputting information of the error rate can be included.

The antenna switching/combining control unit 27 judges the state of deterioration of the reception based on the reception power information, error rate information, frequency shift information due to Doppler shift, etc. obtained from the tuners 24-1 and 24-2, the OFDM demodulation units 25-1 and 25-2, and/or diversity combining unit 26 and instructs the switching/combining operations of the antennas to the switching/combining units 23-1 and 23-2.

The system 2 also employs the same configuration as above. Due to this, the following combinations of the directional antennas and tuners become possible.

Figure 6:
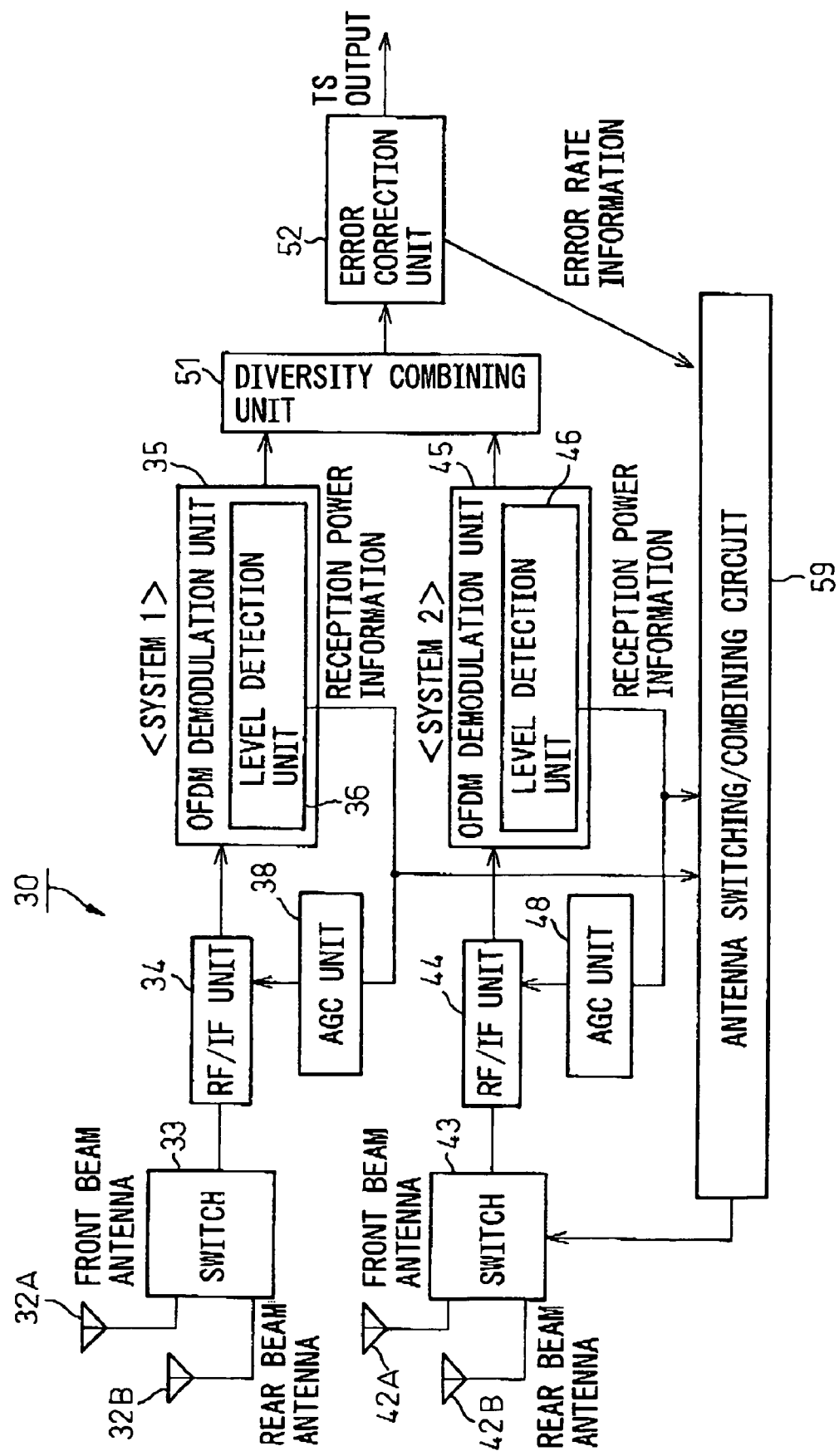
FIG. 6 is a diagram of a more specific example of the configuration of FIG. 5.

(1) A tuner 1 connecting FL and/or RL
(2) A tuner 2 connecting FR and/or RR
(3) A diversity tuner using front beam antennas of FR and FL
(4) A diversity tuner using rear beam antennas of RR and RL
(5) A diversity tuner using a nondirectional antenna obtained by combining FR and RR and combining FL and RL FIG. 6 shows a more specific example of the configuration for facilitating understanding of FIG. 5. In FIG. 6, an OFDM receiver 30 mounted in a vehicle is provided with two systems of switching/combining units, tuners, and OFDM demodulation units and performs reception using frequency division diversity. One system 1 includes a front beam antenna 32A, a rear beam antenna 32B, and a switching/combining unit comprising a switch 33 for switching/combining operations, a tuner 1 comprising an RF/IF unit 34 and an AGC unit 38, and an OFDM demodulation unit 35 including a level detector 36. Note that it is also possible if the level detector 36 is included at the tuner 1 side.

The other system 2 similarly includes a front beam antenna 42A, a rear beam antenna 42B, and a switching/combining unit comprising a switch 43 for switching/combining operations, a tuner 2 comprising an RF/IF unit 44 and an AGC unit 48, and an OFDM demodulation unit 45 including a level detector 46. Note that, here also, it is also possible if the level detector 46 is included at the tuner 2 side.

Figure 1:
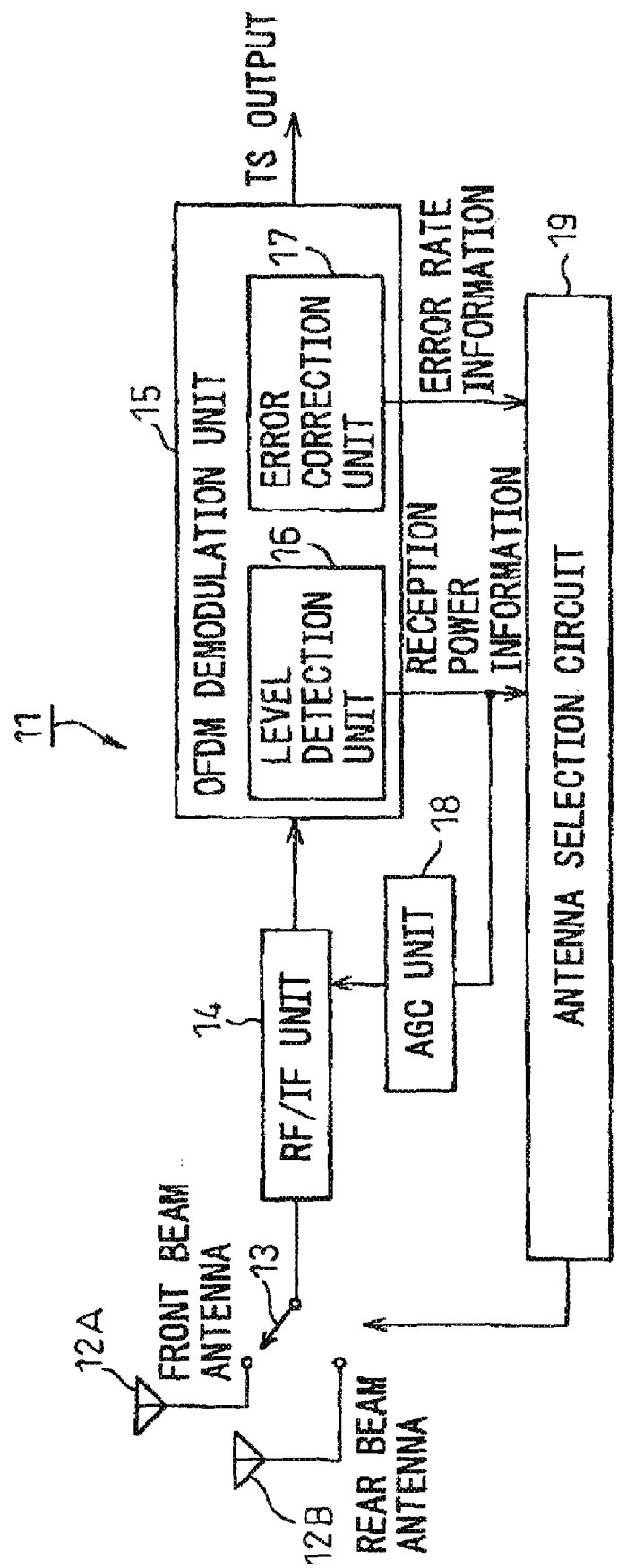
FIG. 1 is a diagram of an example of a conventional OFDM receiver.
Figure 2:
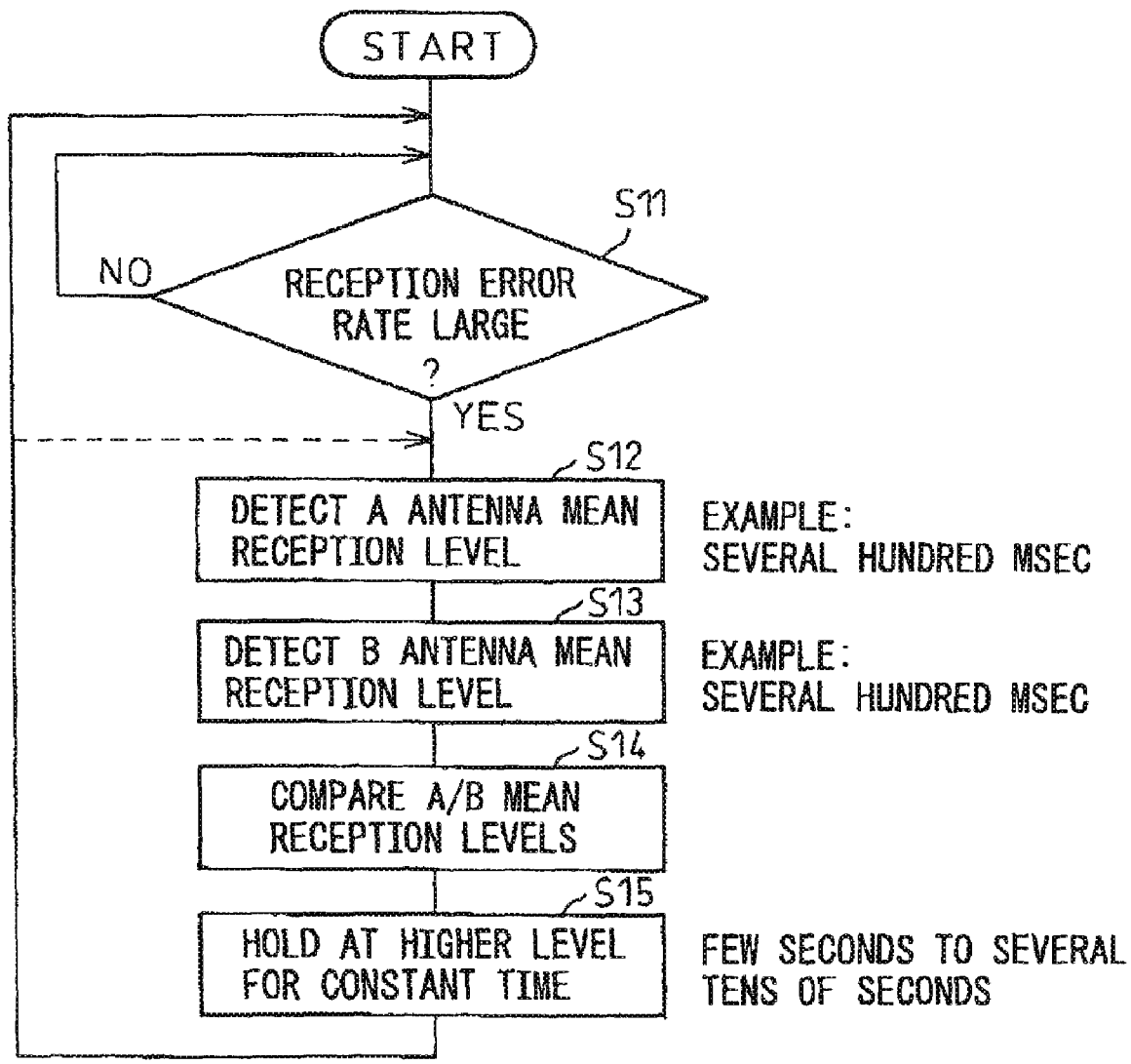
FIG. 2 is a flow chart of an example of control for switching of FIG. 1.
Figure 3:
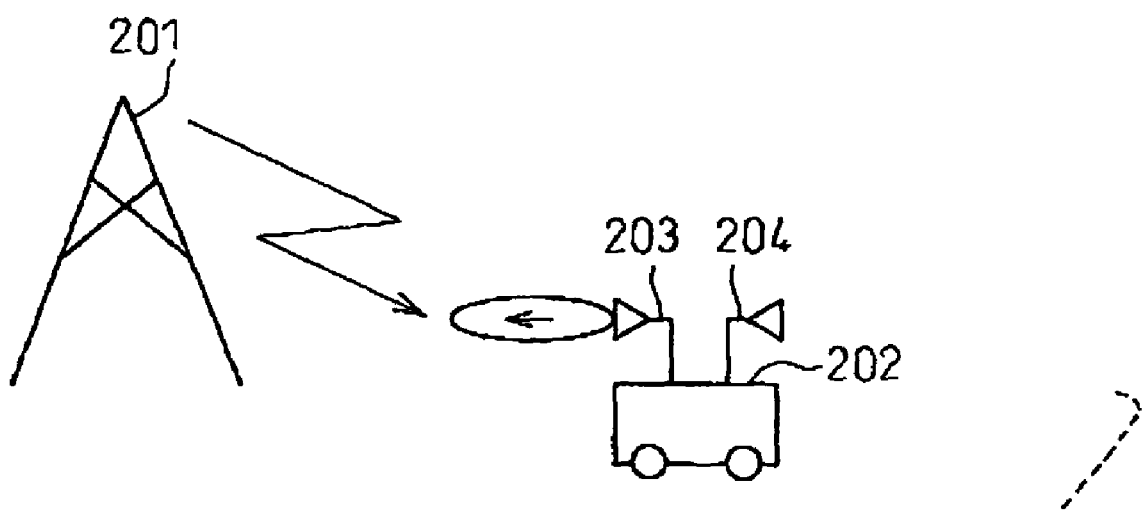
FIG. 3 is a diagram showing an example of a directional antenna switching operation in the prior art.

The operations of the units described above are basically the same as those explained in the conventional example of FIG. 1 except that no error correction units are included in the OFDM demodulation units 35 and 45 and the switches 33 and 43 also perform combining operations other than switching operations.

The outputs from the two OFDM demodulation units 35 and 45 are combined by the diversity combining unit 51 for each sub-carrier demodulated, and the combined output thereof is input to an error correction unit 52. The error correction unit 52 corrects the error to the possible extent and outputs the information of the error rate.

The antenna switching/combining circuit 59 judges the state of deterioration of the reception based on the reception power information from the level detection units 36 and 46, the error rate information from the error correction unit 52, the frequency shift information due to a Doppler shift detected at the OFDM demodulation units 35 and 45, etc., and instructs the switching/combining operations of antennas to the switches 33 and 43.

Figure 7:
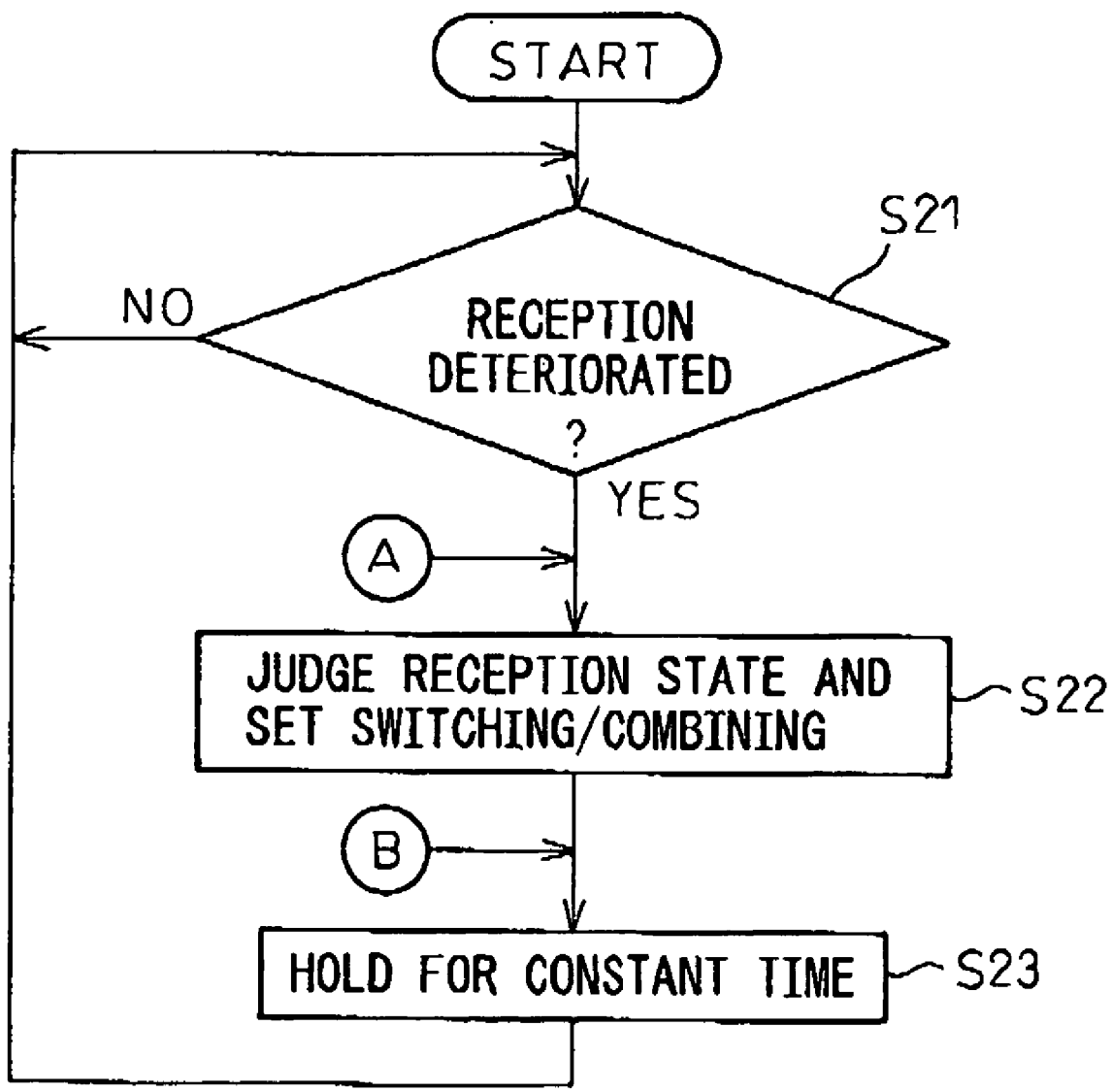
FIG. 7 is a flow chart of an example of the basic control for a switching/combining operation of the present invention.

FIG. 7 shows the basic switching/combining control processing in the embodiments of the present invention. This processing is executed during operation of the OFDM receiver. Here, the other processings performed by the OFDM receiver are omitted.

In FIG. 7, at step 321, "reception deterioration" is judged when the reception error rate, the reception power level, etc. do not satisfy predetermined reference values (Yes). In cases other than this, the present state of reception is maintained. Next, step S22 is the part of the processing operation characterizing the present invention. Here, the states of reception at the present time are detected and judged at the same timing for the plurality of different directional antennas 21A, 21B, 22A, and 22B, and the optimum switch configuration is immediately instructed to the switching/combining units 23-1 and 23-2 based on the results of judgment.

In this way, in these embodiments, the detection and judgment of the states of reception at the present time and the optimum switching/combining operation of the switch based on the results of judgment are executed in one step at the same timing. As a result, even if the vehicle is moving at a high speed, the optimum switching and combining operation of the switch always becomes possible.

At the last step S23, considering the prevention of complicated switching/combining operations, the reduction of the CPU load for processing in the present flow, the moving speed of the vehicle, etc., the once set state of the switch is held for a constant time. After the elapse of that time, the above steps are repeated.

Figure 8:
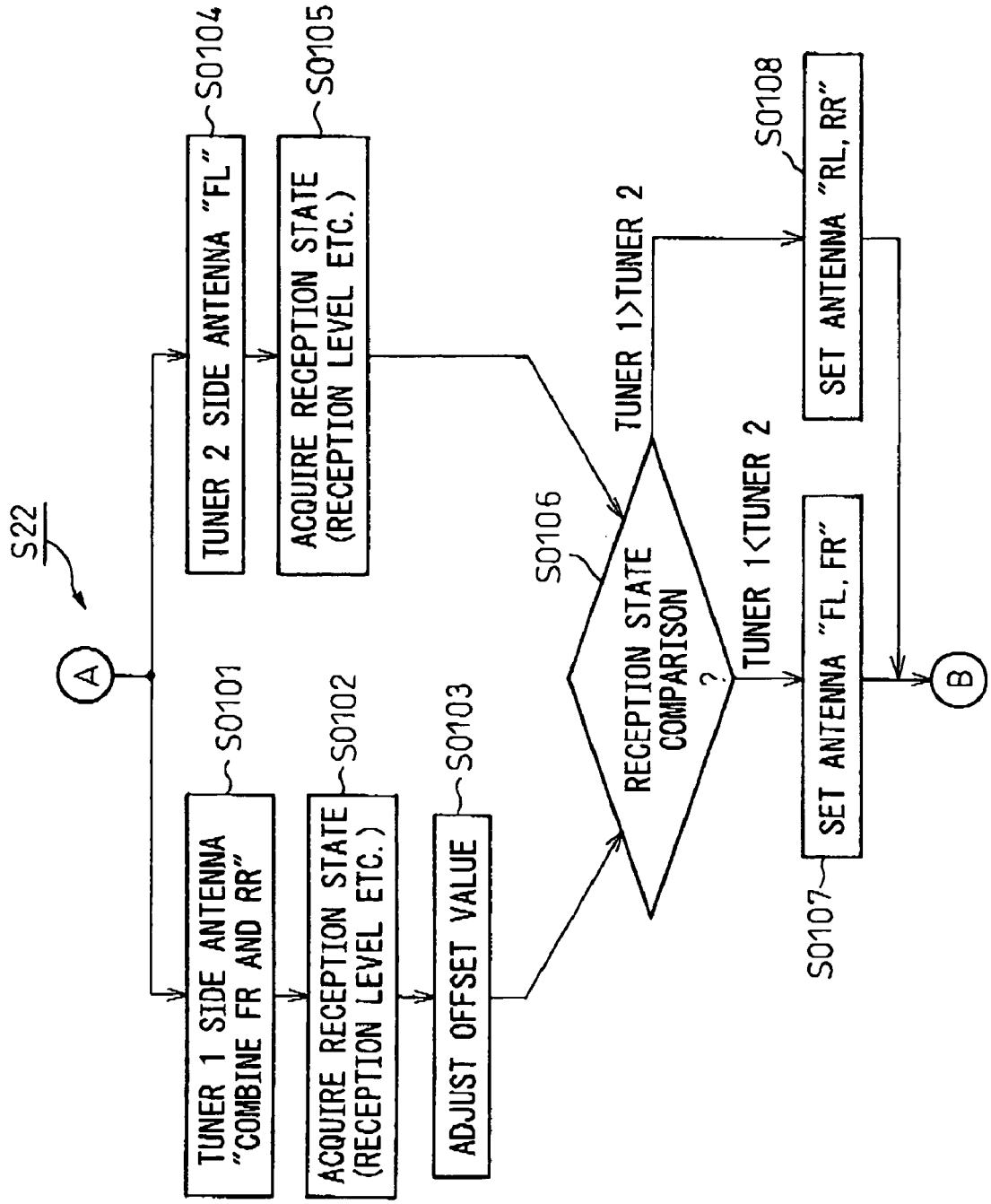
FIG. 8 is a flow chart of a first embodiment of the present invention.

FIG. 8 shows a first embodiment of the present invention. Here, an example of the specific flow of control of step S22 of FIG. 7 is shown. The same also applies to the second to 12th embodiments.

In FIG. 8, at the tuner 1 side (system 1 side), the front beam antenna FR (21A) and the rear beam antenna RR (21B) are combined to form a nondirectional antenna (S0101). At the other tuner 2 side (system 2 side), the front beam antenna FL (22A) is switched to (S0104).

In this state, the tuners 1 and 2 (24-1 and 24-2) detect the states of reception (reception power levels etc.) (S0102 and S0105). The tuner 1 side receiving the combined signal from the front and rear further performs offset adjustment (S0103). In this example, a level of ½ of the received combined signal is defined as the reception level of the tuner 1 side.

For example, if the reception level of a digital television signal (hereinafter, referred to as a "radio wave") from the front of the vehicle is "1" and the reception level from the rear of the vehicle is "0", the reception level of the tuner 1 becomes "½" (=(1+0)/2) and the reception level of the tuner 2 becomes "1". Conversely, if the reception level from the rear of the vehicle is "1" and the reception level from the front of the vehicle is "0", the reception level of the tuner 1 becomes "½" and the reception level of the tuner 2 becomes "0".

The reception levels detected at the tuner 1 and the tuner 2 are immediately compared. If the reception level of the tuner 1 is smaller than the reception level of the tuner 2 (tuner 1="½"<tuner 2="1"), it is judged that the radio wave is being received from the front of the vehicle, and the front beam antenna FR (21A) at the tuner 1 side and the front beam antenna FL (22A) at the tuner 2 side are switched to (S0106 and S0107).

Conversely, if the reception level of the tuner 1 is larger than the reception level of the tuner 2 (tuner 1="½">tuner 2="0"), it is judged that the radio wave is being received from the rear of the vehicle, and the rear beam antenna RR (21B) at the tuner 1 side and the rear beam antenna RL (22B) at the tuner 2 side are switched to (S0106 and S0107).

The optimum antenna orientation is immediately secured by the single series of operations at the point of time of the above detection. In the specific example of FIG. 6, the level detectors 36 and 46 detect the reception levels, and the antenna switching/combining circuit 59 instructs switching/combining operations to the switches 33 and 43 based on the results of comparison.

This example is effective in a configuration of a receiving circuit in which at least one system 1 or 2 must always detect a predetermined reception level or more in order to ensure normal operation. Further, as another aspect of this example, it is also possible to switch the antenna at the tuner 2 side to the rear beam antenna RL (228) or to use the tuner 2 side as a combined antenna and switch the antenna at the tuner 1 side at the time of the start of the detection.

Figure 9:
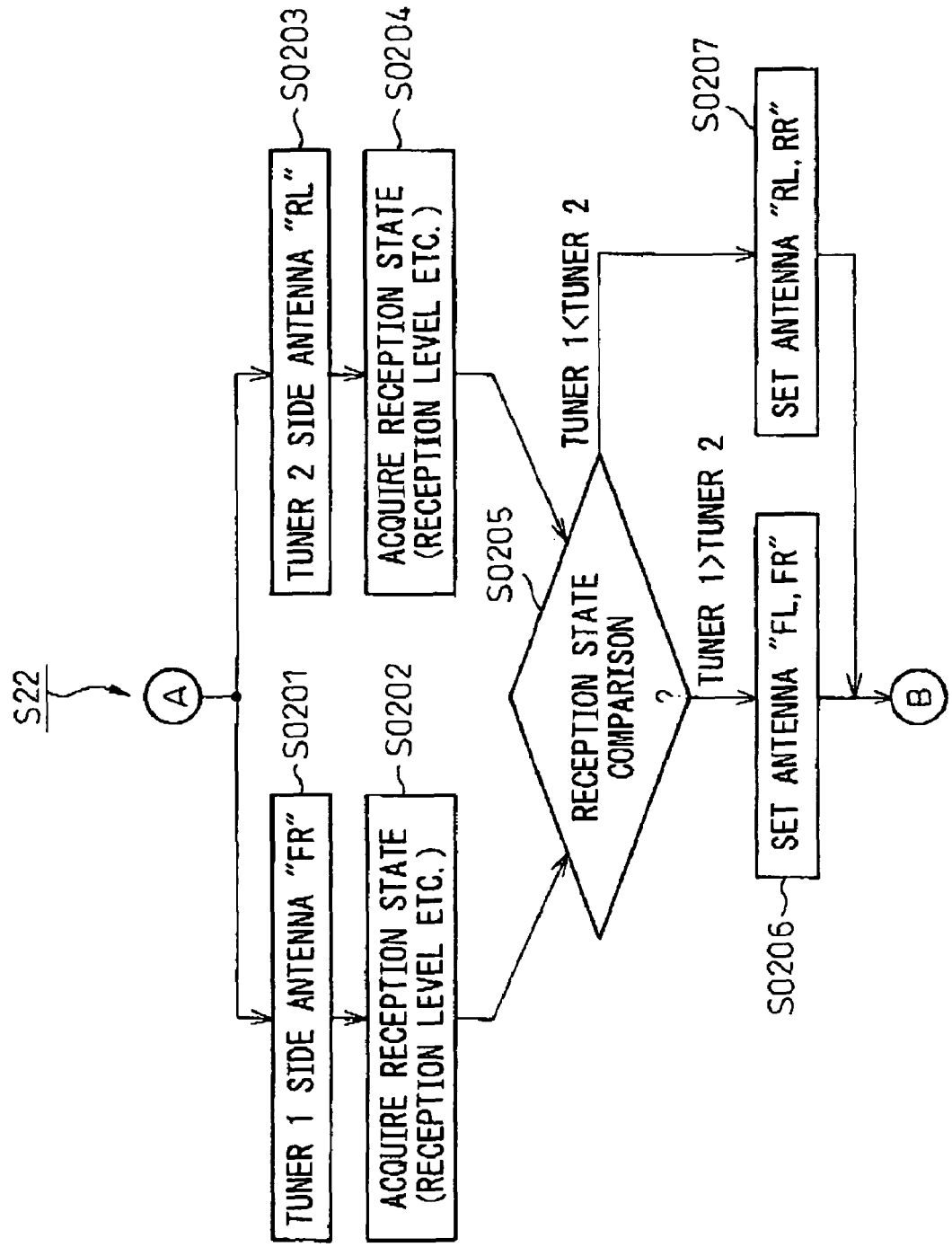
FIG. 9 is a flow chart of a second embodiment of the present invention.

FIG. 9 shows a second embodiment of the present invention.

In this example, first, the tuner 1 side (system 1 side) is switched to the front beam antenna FR (21A), and the tuner 2 side (system 2 side) is switched to the rear beam antenna RL (22B) (S0202 and S0203).

In this state, the tuners 1 and 2 (24-1 and 24-2) detect the states of reception (S0202 and S0204) and compare the states of reception (S0205). If the reception level of the tuner 1 is larger than the reception level of the tuner 2 (tuner 1>tuner 2), it is judged that the radio wave is being received from the front of the vehicle, and the front beam antenna FR (21A) of the tuner 1 side and the front beam antenna FL (22A) of the tuner 2 side are switched to (S0206).

Conversely, if the reception level of the tuner 1 is smaller than the reception level of the tuner 2 (tuner 1<tuner 2), it is judged that the radio wave is being received from the rear of the vehicle, and the rear beam antenna RR (21S) of the tuner 1 side and the rear beam antenna RL (22B) of the tuner 2 side are switched to (S0207).

This example is effective in the case of a configuration of a receiving circuit in which just one of the systems 1 and 2 need only secure a predetermined reception level or more for ensuring normal operation. Further, in the case of this example, the reception from the front direction and the reception from the rear direction are completely separated, therefore there is the advantage that the effect of a Doppler shift is not felt even when moving at a high speed in comparison with the case where they are combined. As another aspect of this example, it is also possible to switch the antenna at the tuner 1 side to the rear beam antenna RR (21B) and to switch the tuner 2 side to the front beam antenna FL (22A) at the time of the start of the detection.

Figure 10:
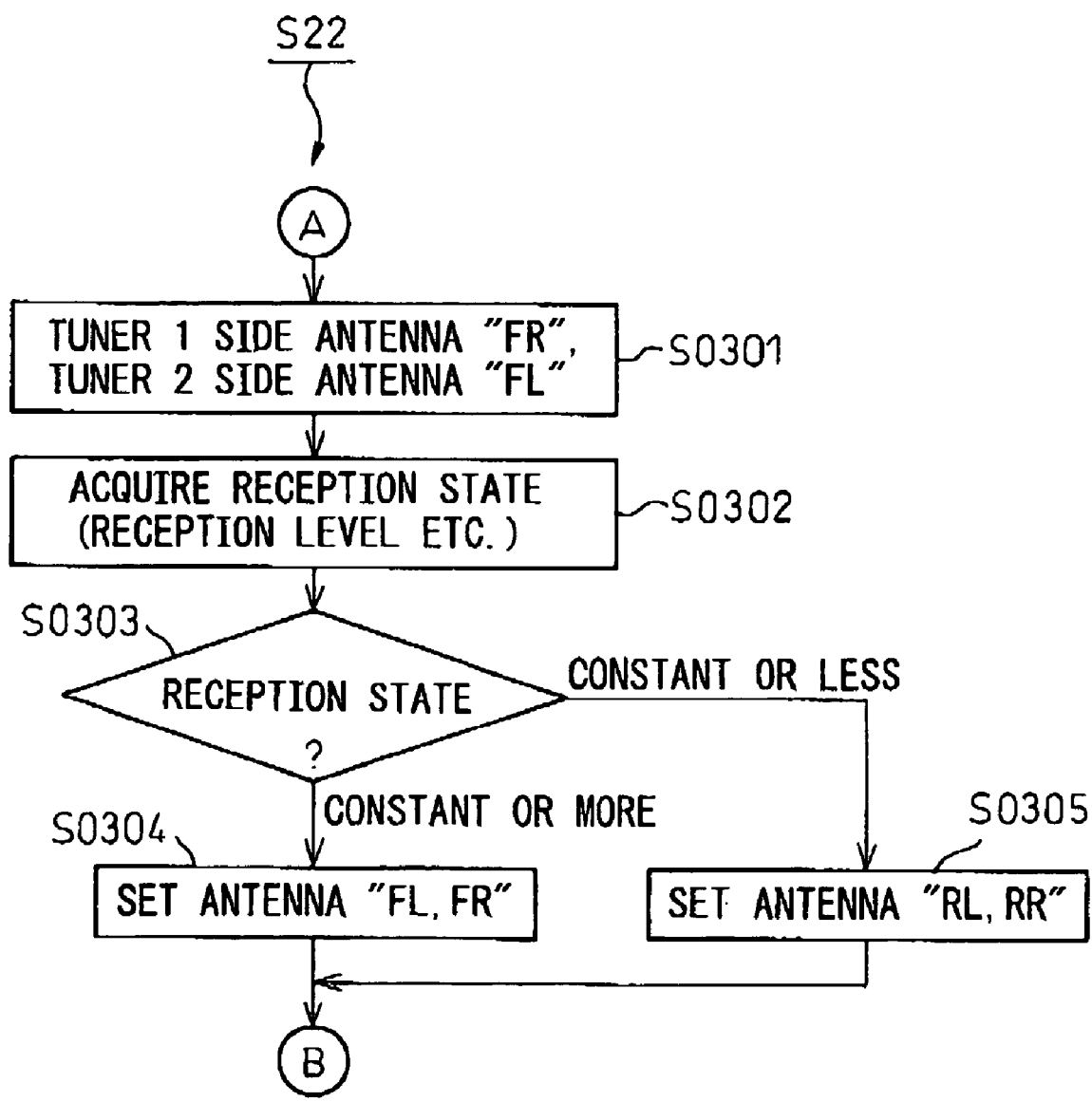
FIG. 10 is a flow chart of a third embodiment of the present invention.

FIG. 10 shows a third embodiment of the present invention.

In this example, first, the tuner 1 side (system 1 side) is switched to the front beam antenna FR (21A), and the tuner 2 side (system 2 side) is switched to the front beam antenna FL (22A) in the same way as the above (S0301).

In this state, the tuners 1 and 2 (24-1 and 24-2) detect the reception levels (S0302). In this example, when the radio wave from the front of the vehicle exceeds a predetermined reference value, the state of reception thereof is maintained (S0303 and S0304), while conversely, when it is the reference value or less, the tuner 1 side is switched to the rear beam antenna RR (21B) and the tuner 2 side is switched to the rear beam antenna RL (22B) (S0305).

In this example, both of the systems 1 and 2 detect the states of reception by using directional antennas of the same orientation, therefore there is the advantage that frequency division diversity can be used even while moving at a high speed. Due to this, the reception sensitivity can be improved. As another aspect of this example, it is also possible if both of the tuner 1 side and the tuner 2 side switch the antennas to the rear beam antennas RR (21B) and RL (22B) at the time of the start of the detection.

Figure 11:
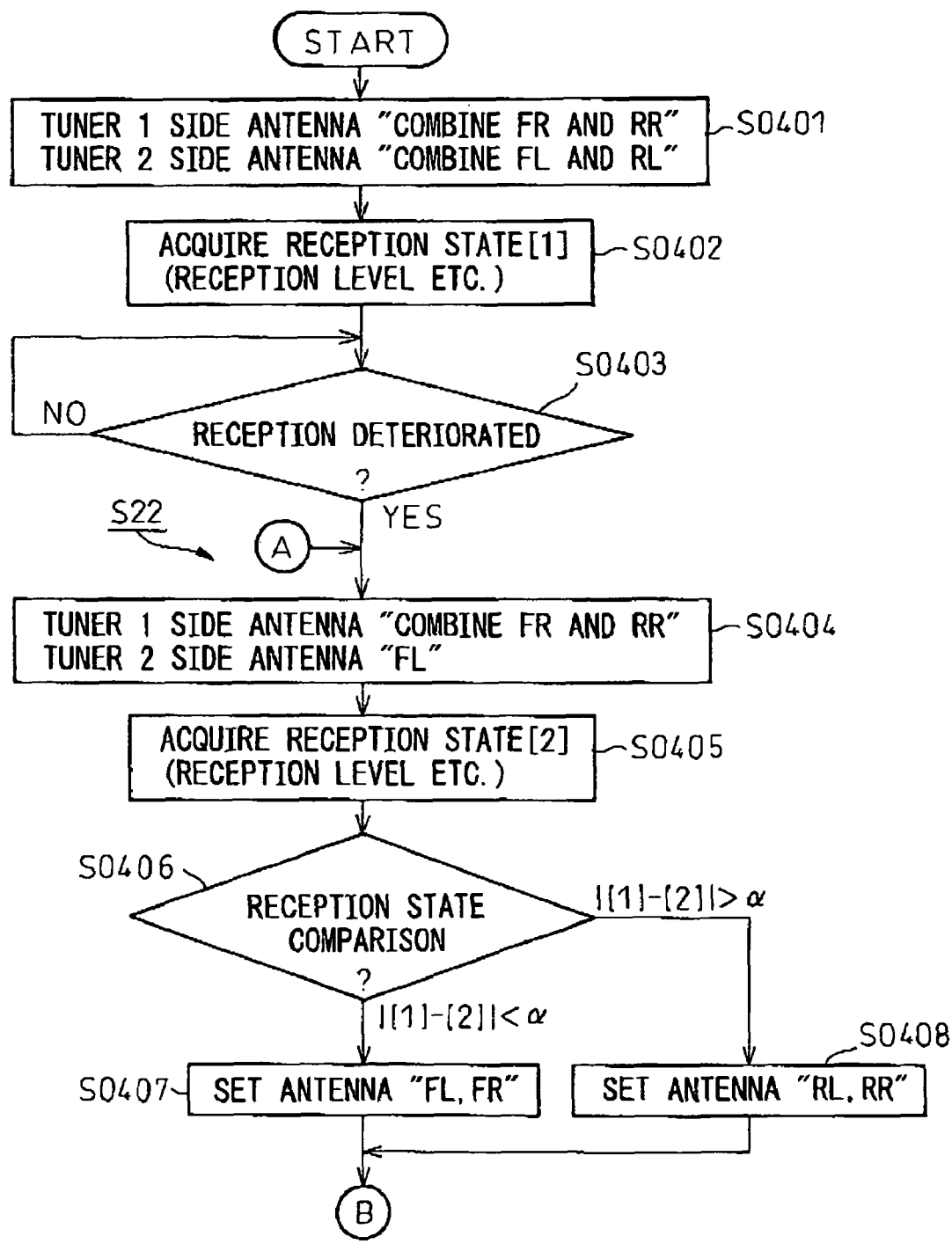
FIG. 11 is a flow chart of a fourth embodiment of the present invention.

FIG. 11 shows a fourth embodiment of the present invention.

This example is a modification of the first embodiment shown in FIG. 8. It differs in the point that one of the objects for comparison of the states of reception is for example the reception level at the time of the start of the reception of the radio wave. This is because generally, at the time of start of reception, the antennas are set for nondirectivity so as to detect the possibility of reception. This example can be applied to a vehicle etc. before the start of the motion or moving at a low speed in which no Doppler shift occurs.

Before starting the operation according to this example, first the antennas of both of the tuner 1 side (system 1 side) and 2 side (system 2 side) are combined and set for nondirectivity (S0401), then the state of reception of the radio wave received in that state is acquired (S0402). In this state, frequency division diversity can be utilized.

Next, when the state of reception deteriorates due to for example high speed motion (S0403), control the same as that of the previously explained first embodiment is started (S0404). Here, the overall reception level detected at the tuner 1 and the tuner 2 (S0405) is compared with the state of reception (S0402) before the start of the present control (S0406). When the difference of the reception levels of the two is smaller than a predetermined reference value, it is judged that the radio wave is being received from the front of the vehicle, and the front beam antenna FR (21A) of the tuner 1 side and the front beam antenna FL (22A) of the tuner 2 side are switched to (S0407).

Conversely, when the difference of the reception levels of the two is larger than a predetermined reference value, it is judged that the radio wave is being received from the rear of the vehicle, and the rear beam antenna RR (21B) at the tuner 1 side and the rear beam antenna RL (22B) of the tuner 2 side are switched to (S0408).

This example as well, in the same way as the first embodiment, is effective in the case of a configuration of a receiving circuit in which at least one of the systems 1 and 2 must always detect a predetermined reception level or more for securing normal operation. Further, frequency division diversity can be utilized, so the reception sensitivity can be improved in the above reception environment. Note that, as another aspect of this example, it is also possible to switch the antenna at the tuner 2 side to the rear beam antenna RL (22B) or use the tuner 2 side as a combined antenna and switch the antenna at the tuner 1 side.

Figure 12:
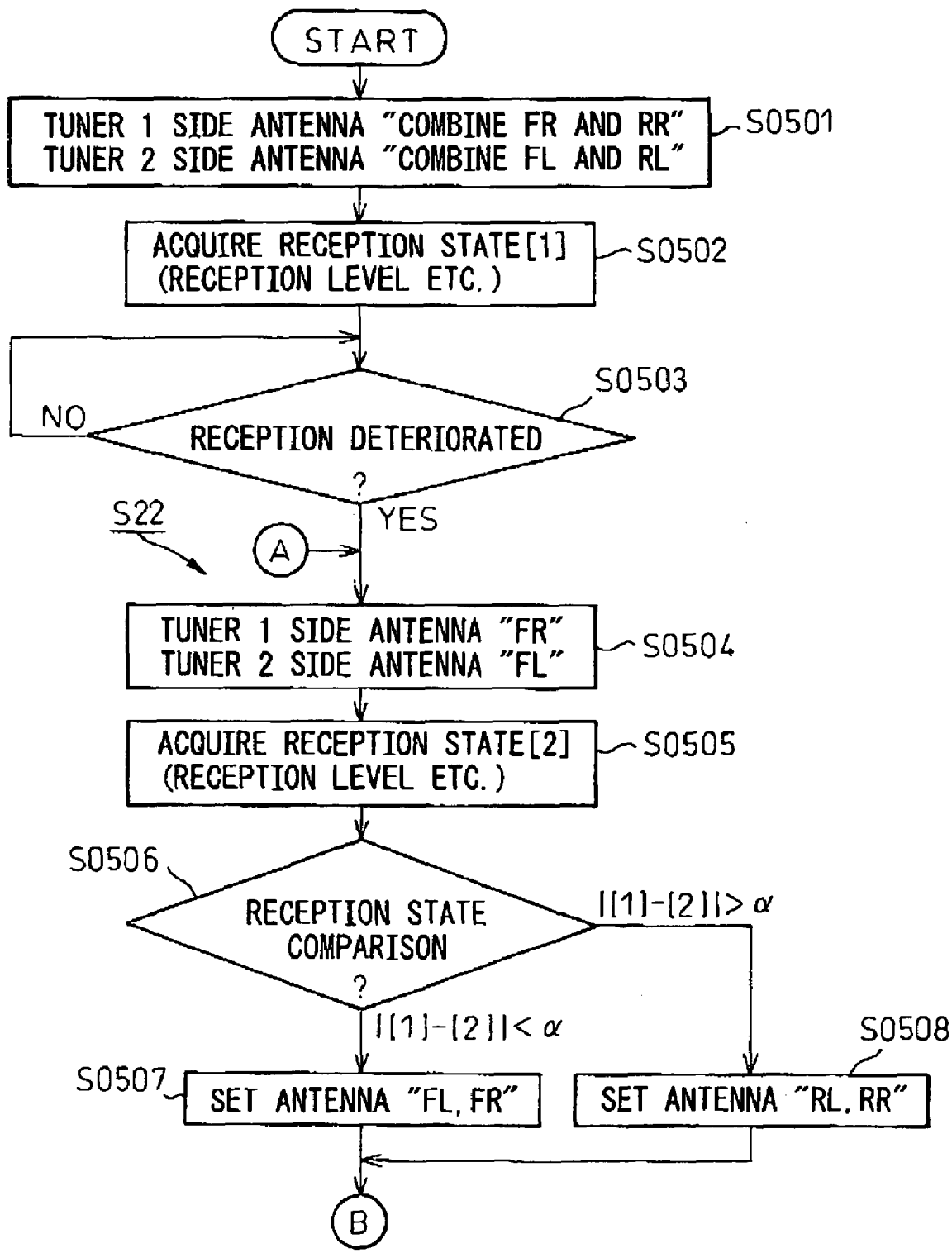
FIG. 12 is a flow chart of a fifth embodiment of the present invention.

FIG. 12 shows a fifth embodiment of the present invention.

This example is a modification of the third embodiment shown in FIG. 10, but further is predicated on the reception environment of FIG. 11. Accordingly, steps 50501 to S0503 of this example are the same as S0401 to S0403 of FIG. 9, so no further explanation is given here.

In this example, when detecting deterioration of reception (S0503), the tuner 1 side (system 1 side) is switched to the front beam antenna FR (21A) and the tuner 2 side (system 2 side) is switched to the front beam antenna FL (22A) in the same way as the above (S0504).

In this state, the tuners 1 and 2 (24-1 and 24-2) detect the states of reception (S0505). Here, the overall reception level detected at the tuner 1 and the tuner 2 (S0505) and the state of reception before the start of the present control (S0502) are compared (S0506). As a result, if the difference of the reception levels of the two is smaller than a predetermined reference value, it is judged that the radio wave is being received from the front of the vehicle, and the front beam antenna FR (21A) at the tuner 1 side and the front beam antenna FL (22A) at the tuner 2 side are switched to (S0507).

Conversely, when the difference of the reception levels between the two is larger than a predetermined reference value, it is judged that the radio wave is being received from the rear of the vehicle, and the rear beam antenna RR (21B) at the tuner 1 side and the rear beam antenna RL (223) at the tuner 2 side are immediately switched to (S0508).

In this example, both of the systems 1 and 2 after the start of the detection detect the states of reception by using the directional antennas of the same orientation, so frequency division diversity can be used without regard to whether it is before or after the start of the detection (S0502 and S0505). As another aspect of this example, it is also possible if both of the tuner 1 side and the tuner 2 side switch to the rear beam antennas RR (21B) and RL (22B) after detecting deterioration.

Figure 13:
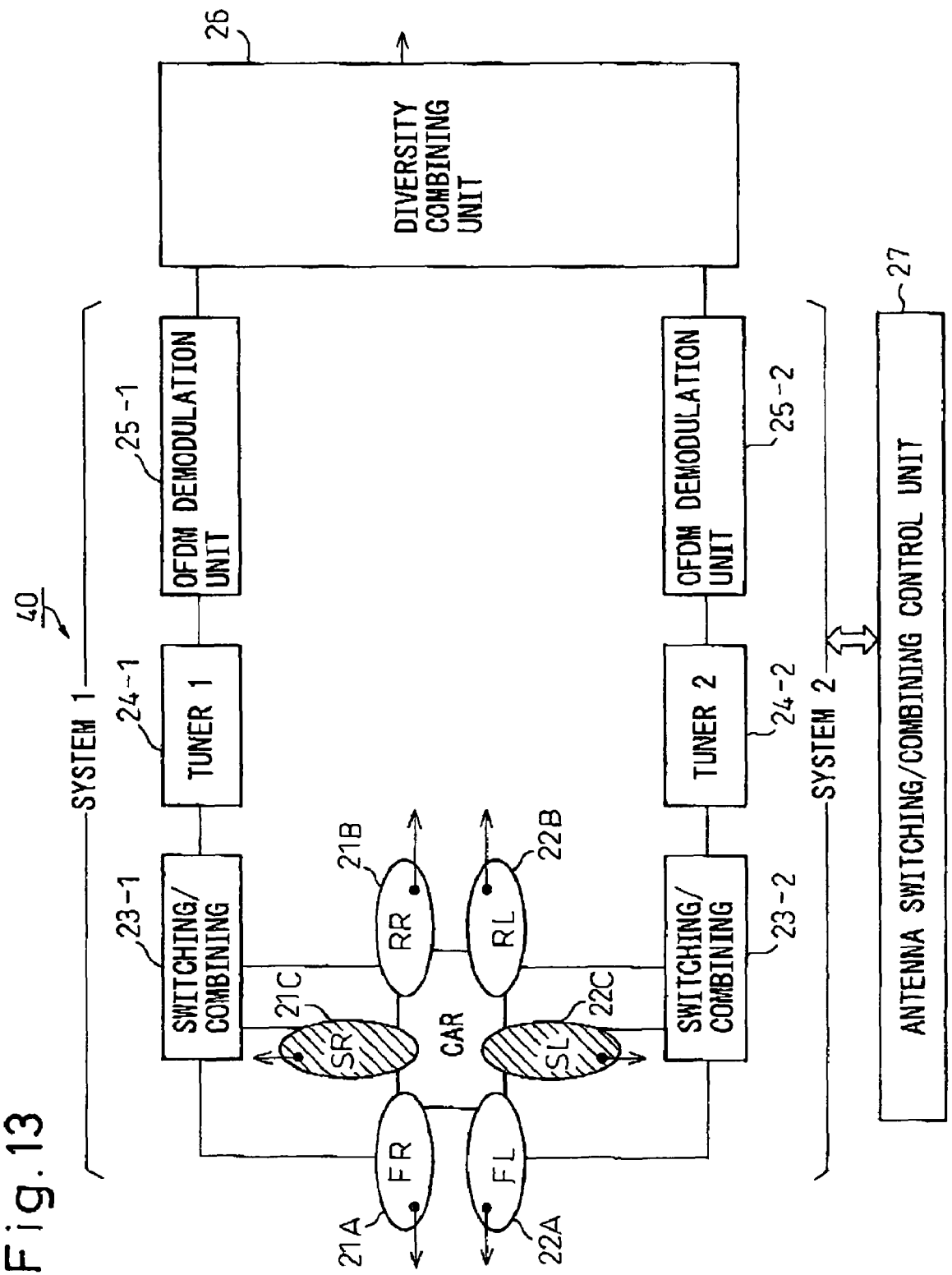
FIG. 13 is a diagram of the basic configuration of another OFDM receiver according to the present invention.

FIG. 13 shows the basic configuration of another OFDM receiver according to the present invention. An OFDM receiver 40 of this example has the same configuration as that of FIG. 5 except that a right direction beam antenna SR (21C) and a left direction beam antenna SL (22C) indicated by hatching are added, and the systems 1 and 2 perform the switching/combining control including them.

Figure 14:
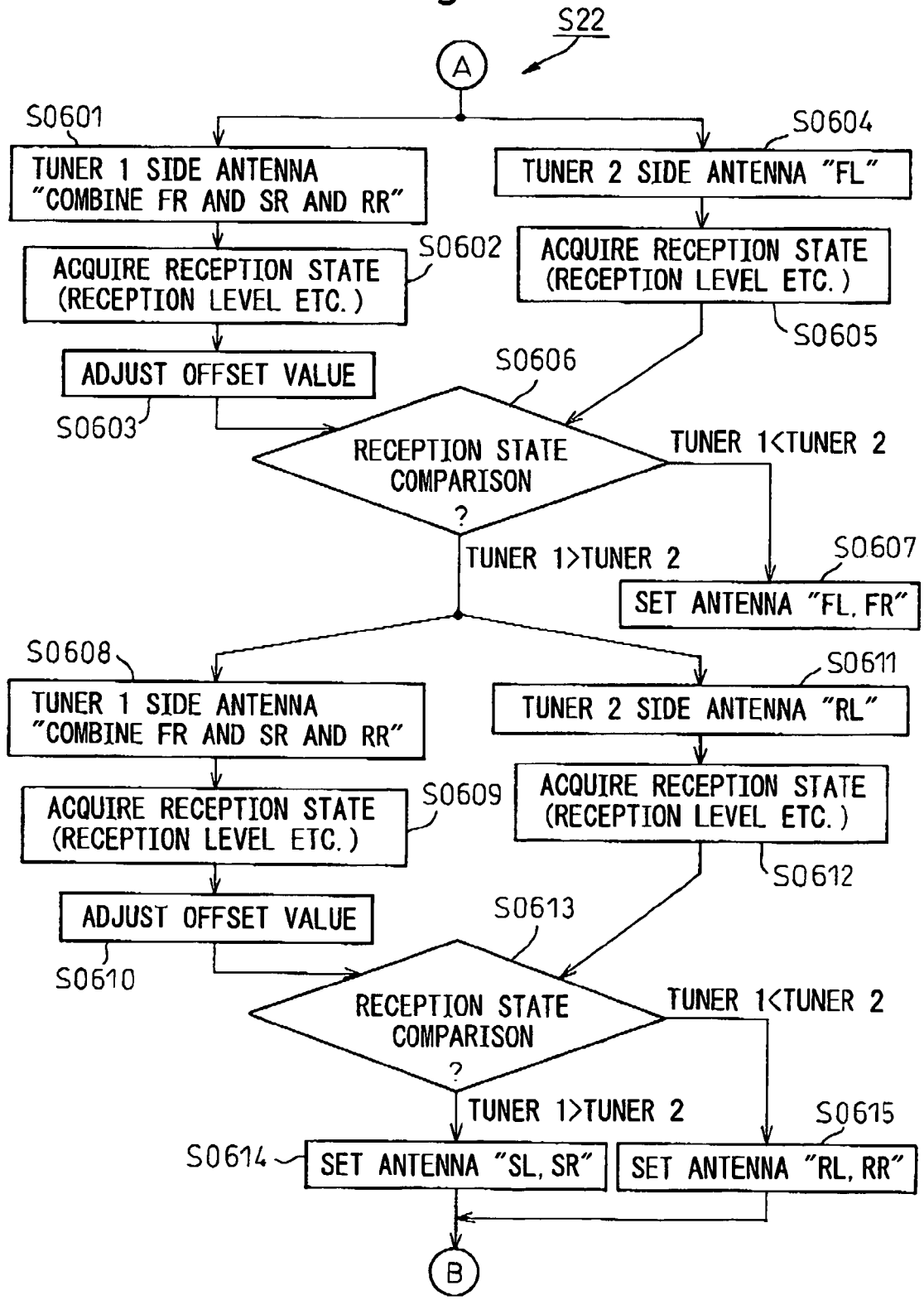
FIG. 14 is a flow chart of a sixth embodiment of the present invention.

FIG. 14 shows a sixth embodiment of the present invention.

This example is a modification of the first embodiment shown in FIG. 8. A selection step of the right direction beam antenna SR (21C) and the left direction beam antenna SL (22C) is added.

In this example, all of three antennas of the front beam antenna FR (21A), the right direction beam antenna SR (21C), and the rear beam antenna RR (21B) are combined at the tuner 1 side (system 1 side) to form a nondirectional antenna when deterioration of the reception is detected (S0601). The other tuner 2 side (system 2 side) is switched to the front beam antenna FL (22A) (S0604).

In this state, the tuners 1 and 2 (24-1 and 24-2) detect the states of reception (reception power levels etc.) (S0602 and S0605), and the tuner 1 side receiving the three combined signals further performs offset adjustment (S0603). Here, a level of ⅓ of the received combined signal is determined as the reception level at the tuner 1 side. For example, if the reception level of the radio wave from the front of the vehicle is "0", the reception level of the radio wave from the side direction of the vehicle is "1", and the reception level of the radio wave from the rear of the vehicle is "0", the reception level of the tuner 1 becomes "⅓" (=(0+1+0)/3), and the reception level of the tuner 2 becomes "0".

In this example, the reception levels detected at the tuner 1 and the tuner 2 are compared as they are. When the reception level of the tuner 1 is larger than the reception level of the tuner 2 (tuner 1="⅓">tuner 2="0"), it is judged that the radio wave is being received from the rear or side of the vehicle and the routine proceeds to the next steps (S0608 and S0611).

On the other hand, when the reception level of the tuner 1 is smaller than the reception level of the tuner 2 (tuner 1<tuner 2), it is judged that the radio wave is being received from the front of the vehicle and the front beam antenna (21A) at the tuner 1 side and the front beam antenna FL (22A) at the tuner 2 side are switched to in the same way as the first embodiment (S0606 and S0607). At steps S0608 and S0611, only the tuner 2 side is switched to the rear beam antenna RL (22B) and the state of reception thereof is detected without changing the settings of the tuner 1 side (S0612). Note that, for steps S0608 to 50610, it is also possible to use the detection values of the previous steps S0601 to 30603 as they are or newly detect the states of reception.

By the comparison of the states of reception at the next stage (S0613), when the reception level of the tuner 1 is larger than the reception level of the tuner 2 (tuner 1="⅓">tuner 2="0"), the possibility of reception of the radio wave from the rear of the vehicle is eliminated, it is judged that the reception of the radio wave is from the remaining side direction, and the side beam antenna SR (21C) at the tuner 1 side and the side beam antenna SL (22C) at the tuner 2 side are switched to (S0614). Note that, for reception of the radio wave from the two side directions, it is not necessary to consider mutual interference due to Doppler shift.

On the other hand, when the reception level of the tuner 1 is smaller than the reception level of the tuner 2 (tuner 1<tuner 2), it is judged that the radio wave is being received from the rear of the vehicle, and the rear beam antenna RR (21B) at the tuner 1 side and the rear beam antenna RL (222) at the tuner 2 side are immediately switched to in the same way as the first embodiment (S0615).

This example can further improve the reception sensitivity at the time of setting to a nondirectional antenna compared with the first embodiment by the amount of the addition of the side beam antennas SR (21C) and SL (22C). Further, as another aspect of this example, it is also possible to set the tuner 2 side to a nondirectional antenna or reverse the switching sequences of the front beam antenna and the rear beam antenna.

Figure 15:
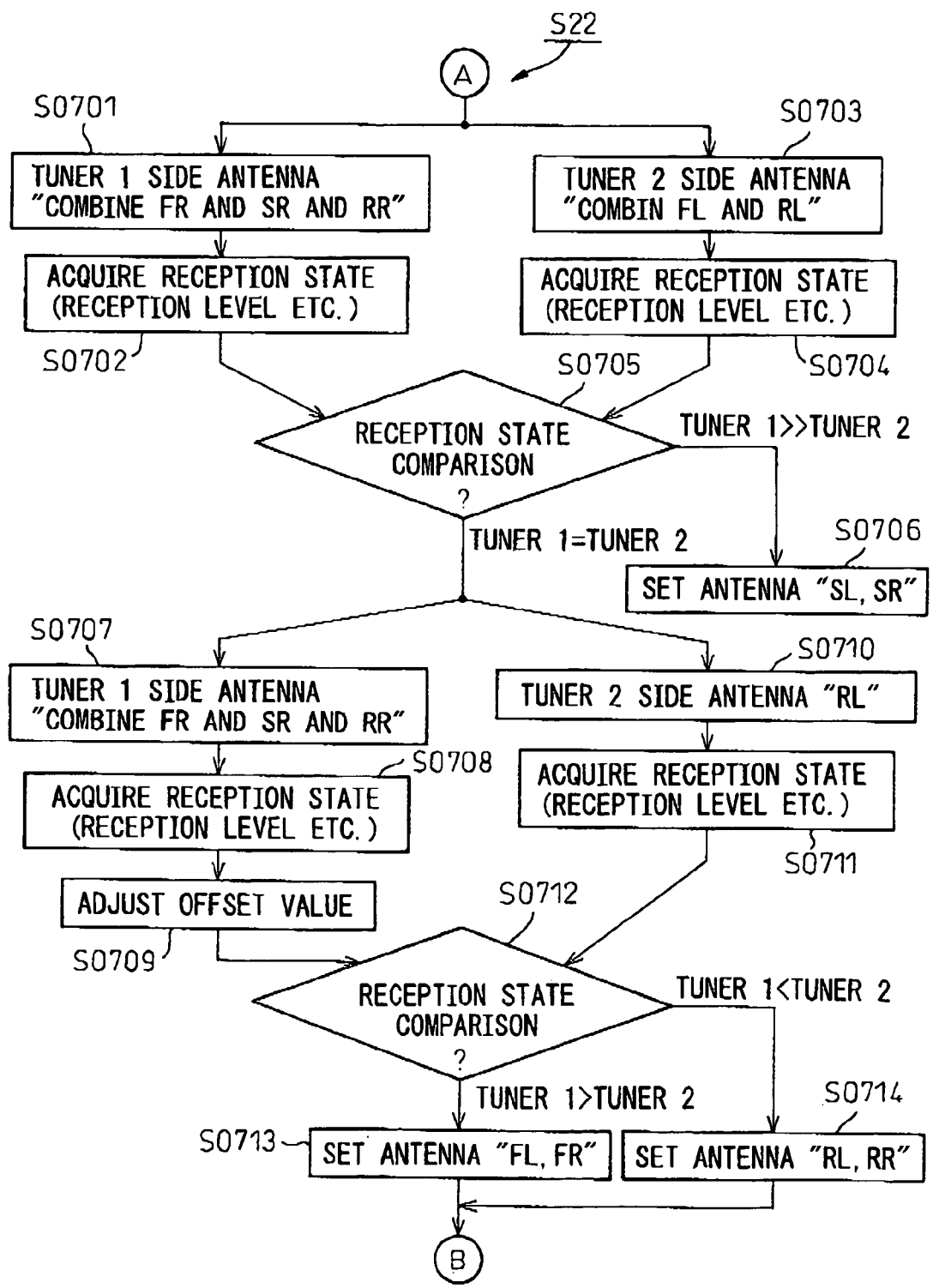
FIG. 15 is a flow chart of a seventh embodiment of the present invention.

FIG. 15 shows a seventh embodiment of the present invention.

This example is a modification of the sixth embodiment shown in FIG. 14. When detecting deterioration of the reception, the antennas are set the same as that of FIG. 14 at the tuner 1 side (system 1 side) (S0701), and the other tuner 2 side (system 2 side) is set to combine the front beam antenna FL (22A) and the rear beam antenna RL (22A) (S0703). Due to this, the tuner 2 side receives the radio wave from the front and rear directions of the vehicle.

In this state, the tuners 1 and 2 (24-1 and 24-2) detect the states of reception (reception power levels etc.) (S0702 and S0704) and compare the states of reception with each other (S0705). Here, when the reception level of the tuner 1 is much larger than the reception level of the tuner 2 (tuner 1>>tuner 2), it is judged that the radio wave is being received from the side direction of the vehicle, and the side beam antenna SR (21C) at the tuner 1 side and the side beam antenna SL (22C) at the tuner 2 side are switched to (S0706).

On the other hand, when the reception level of the tuner 1 is substantially equal to the reception level of the tuner 2 (tuner 1=tuner 2), it is judged from which of the front or rear direction of the vehicle the radio wave is being received according to the same technique as that of the first embodiment of FIG. 8 or the sixth embodiment of FIG. 14 (S0705 to S0712), and the corresponding antennas are switched in accordance with the result (S0713 or 0714).

This example is the same as the 14th embodiment except first the antenna reception of the side direction is set. As another aspect of this example, it is also possible to switch the antenna to the front beam antenna FL (22A) in place of switching the antenna to the rear beam antenna RL (22B) at the tuner 2 side (S0710).

Figure 16:
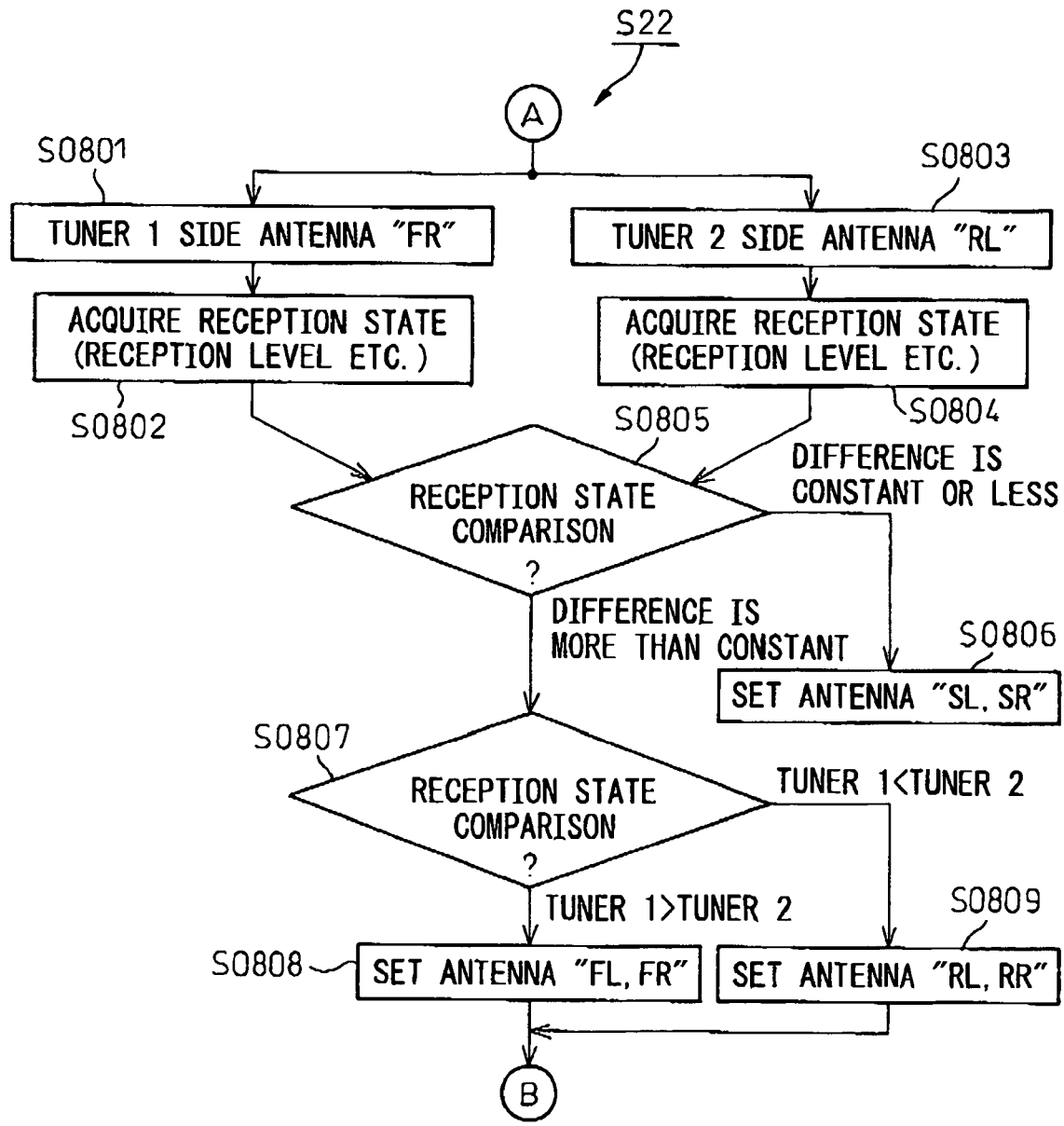
FIG. 16 is a flow chart of an eighth embodiment of the present invention.

FIG. 16 shows an eighth embodiment of the present invention.

This example is a modification of the second embodiment shown in FIG. 9 and has the addition of a selection step of the right direction beam antenna SR (21C) and the left direction beam antenna SL (22C).

In this example, when deterioration of the reception is detected, first the tuner 1 side (system 1 side) is switched to the front beam antenna FR (21A), and the tuner 2 side (system 2 side) is switched to the rear beam antenna RL (22B) (S0801 and S0803).

In this state, the tuners I and 2 (24-1 and 24-2) detect the states of reception (S0802 and S0804) and compare the states of reception (S0805). Here, when the difference between the reception level of the tuner 1 and the reception level of the tuner 2 is smaller than a constant value, that is, when both of the radio waves from the front and rear directions are small (substantially the same) due to the reception of the radio wave from the side direction, it is judged that the radio wave is being received from the side direction of the vehicle, and the side beam antenna SR (21C) at the tuner 1 side and the side beam antenna SL (22C) at the tuner 2 side are switched to (S0806).

On the other hand, when the difference between the reception level of the tuner 1 and the reception level of the tuner 2 is large, it is judged that the radio wave is being received from either the front or rear direction of the vehicle, and, by the same technique as that of the second embodiment of FIG. 9 (S0807), the antenna is switched to the corresponding front direction or rear direction antenna (S0808 or S0809).

This example can further improve the reception sensitivity at the time of setting to a nondirectional antenna compared with the second embodiment by the amount of addition of the side beam antennas SR (21C) and SL (22C). Further, as another aspect of this example, it is also possible to switch the antenna at the tuner 1 side to the rear beam antenna RR (21B) and switch the tuner 2 side to the front beam antenna FL (22A) at the time of the start of the detection (S0801 and S0803).

Figure 17:
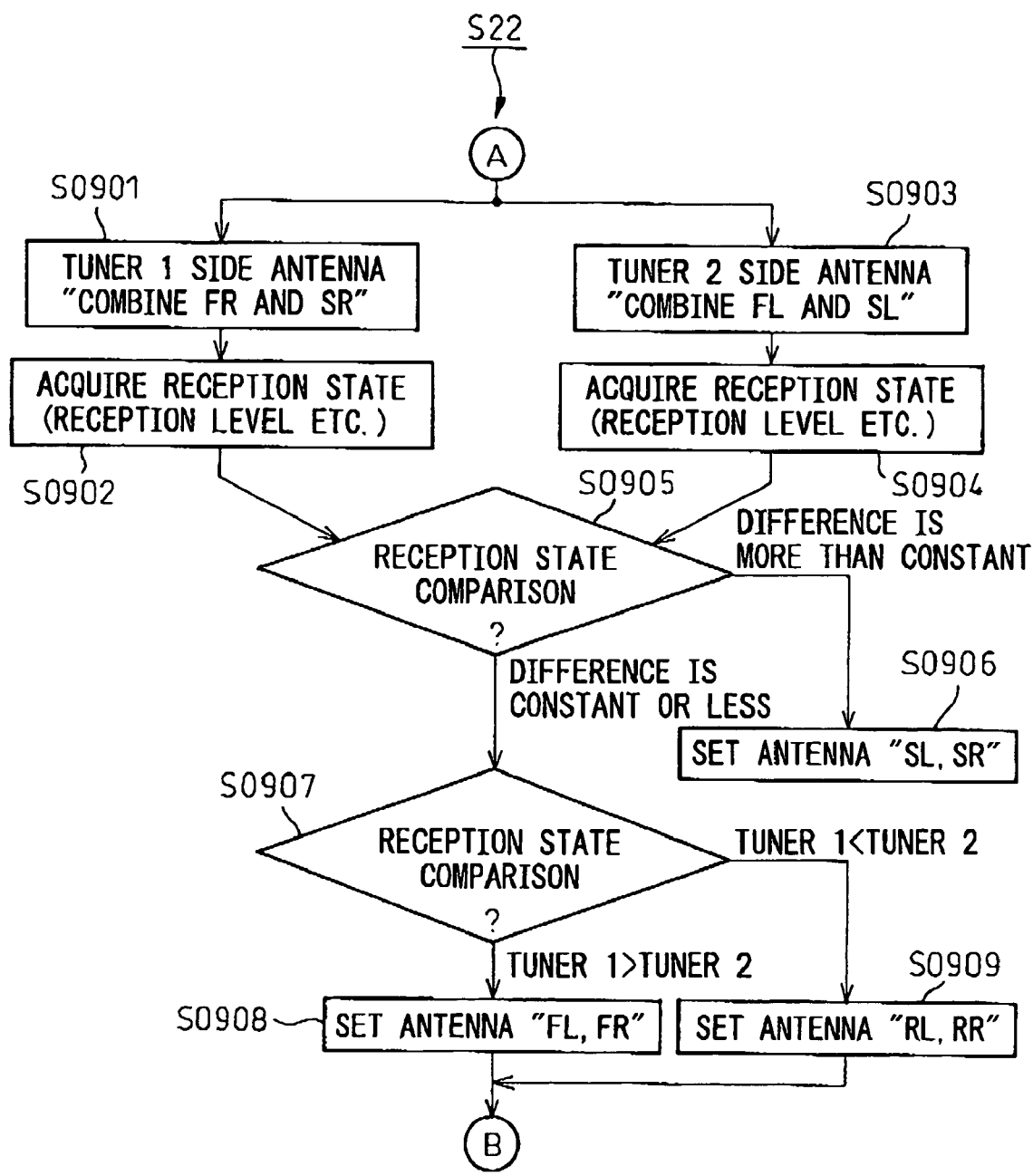
FIG. 17 is a flow chart of a ninth embodiment of the present invention.

FIG. 17 shows a ninth embodiment of the present invention.

This example is a modification of the third embodiment shown in FIG. 10. Here, when deterioration of the reception is detected, the tuner 1 side (system 1 side) is set to combine the front beam antenna FR (21A) and the side beam antenna SR (21C) (S0901), and the tuner 2 side (system 2 side) is set to combine the front beam antenna FL (22A) and the side beam antenna SL (22C) (S0903). In this state, frequency division diversity can be utilized. The same applies to the following 10th to 12th embodiments.

In this state, the tuners 1 and 2 (24-1 and 24-2) detect the states of reception (30902 and S0904) and compare the states of reception (S0905). Here, when the difference of the reception level of the tuner 1 and the reception level of the tuner 2 is larger than a constant value, that is, when the radio wave from either the left side or right side direction is received (in this case, both of radio waves from the front and rear directions are small and substantially equal to each other), it is judged that the radio wave is being received from the side direction of the vehicle, and the side beam antenna SR (21C) at the tuner 1 side and the side beam antenna SL (22C) at the tuner 2 side are switched to (S0906).

On the other hand, when the difference between the reception level of the tuner 1 and the reception level of the tuner 2 is small, it is judged that the radio wave is being received from one of the front or rear of the vehicle, and, by the same technique as that of the third embodiment of FIG. 10 (S0907), the corresponding front direction or rear direction antenna is set (S0908 or S0909).

This example can further improve the reception sensitivity at the time of setting to a nondirectional antenna compared with the third embodiment by the amount of the addition of the side beam antennas SR (21C) and SL (22C). Further, utilization of frequency division diversity is possible. As another aspect of this example, it is also possible to set the tuner 1 side and tuner 2 side to combine the rear beam antenna RR (218) and the side beam antenna SR (21C) and combine the rear beam antenna RL (22B) and the side beam antenna SL (22C) at the time of the start of detection (S0901 and S0903).

Figure 18:
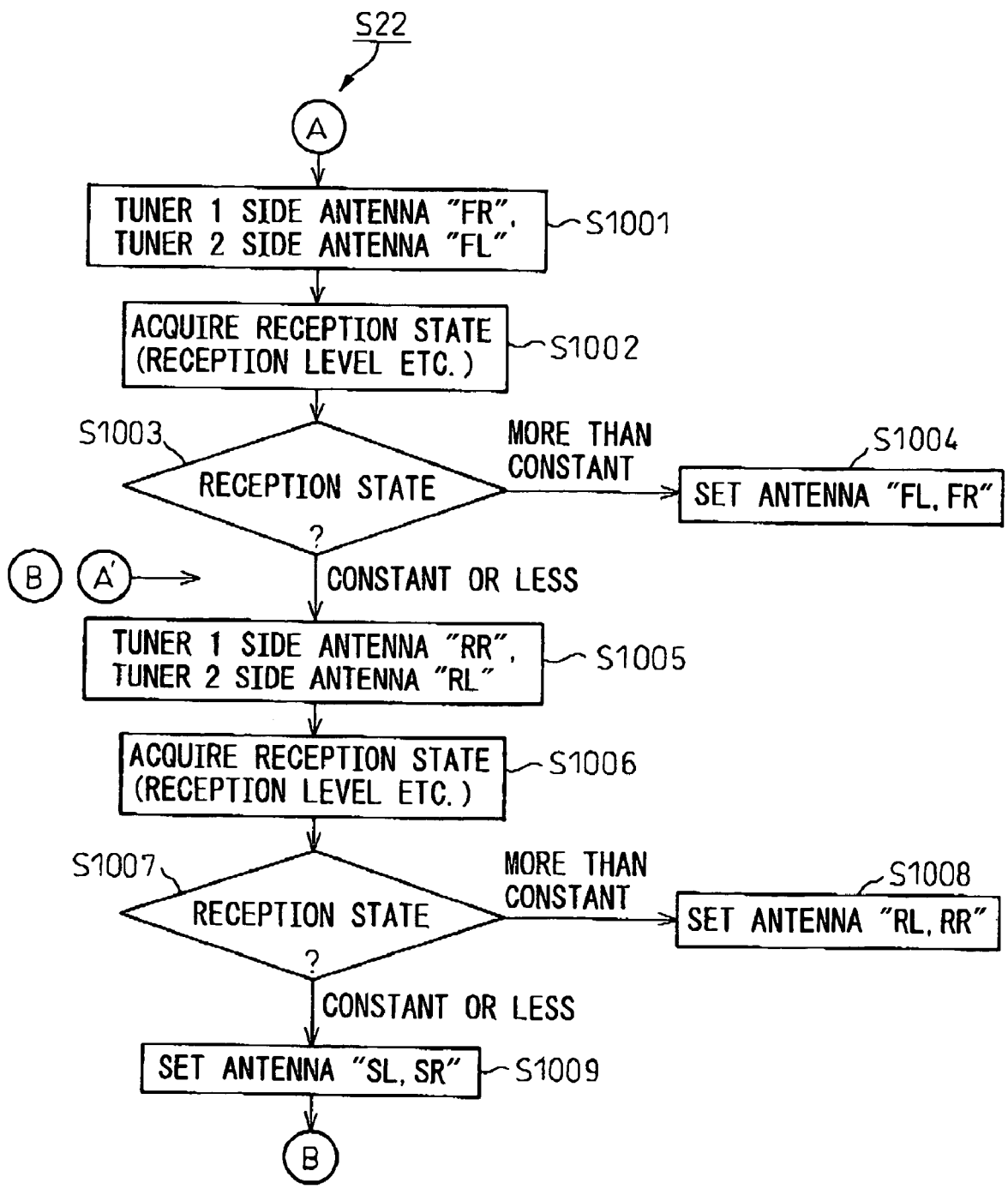
FIG. 18 is a flow chart of a 10th embodiment of the present invention.

FIG. 18 shows a 10th embodiment of the present invention.

This example is a modification of the ninth embodiment. Here, when detecting deterioration of the reception, first, both of the tuner 1 side and the tuner 2 side (system 1 side) are switched to the front beam antenna FR (21A) and the front beam antenna FL (22A) (S1001). When the reception levels acquired in this state (S1002) are a predetermined reference level or more, it is judged that the radio wave is being received from the front direction and the antenna settings thereof are maintained (S1003 and 1004).

Conversely, when they are less than the predetermined reference level, in order to distinguish the radio wave reception of the rear direction or the side direction, both of the tuner 1 side and the tuner 2 side (system 1 side) are switched to the rear beam antenna RR (21B) and the rear beam antenna RL (22B) next (S1005). Then, if the states of reception exceed the predetermined reference level, it is judged that the radio wave is being received from the rear direction and the antenna setting thereof is maintained (S1007 and 1008).

Conversely, if they are the predetermined reference level or less, it is judged that the radio wave is being received not from the rear direction, but from the side direction, and both of the tuner 1 side and the tuner 2 side switch to the side beam antennas SR (21C) and SL (22C) (S1007 and S1009).

In this example, there is the advantage that the selection of a side direction beam antenna consequently becomes possible by just using the selection routine of the front and rear beam antennas. Accordingly, no special processing for selecting the side beam antenna occurs. Further, here, frequency division diversity can be utilized. As another aspect of this example, it is also possible to reverse the processing sequences of steps S1001 to S1004 and steps S1005 to 51008.

Figure 19:
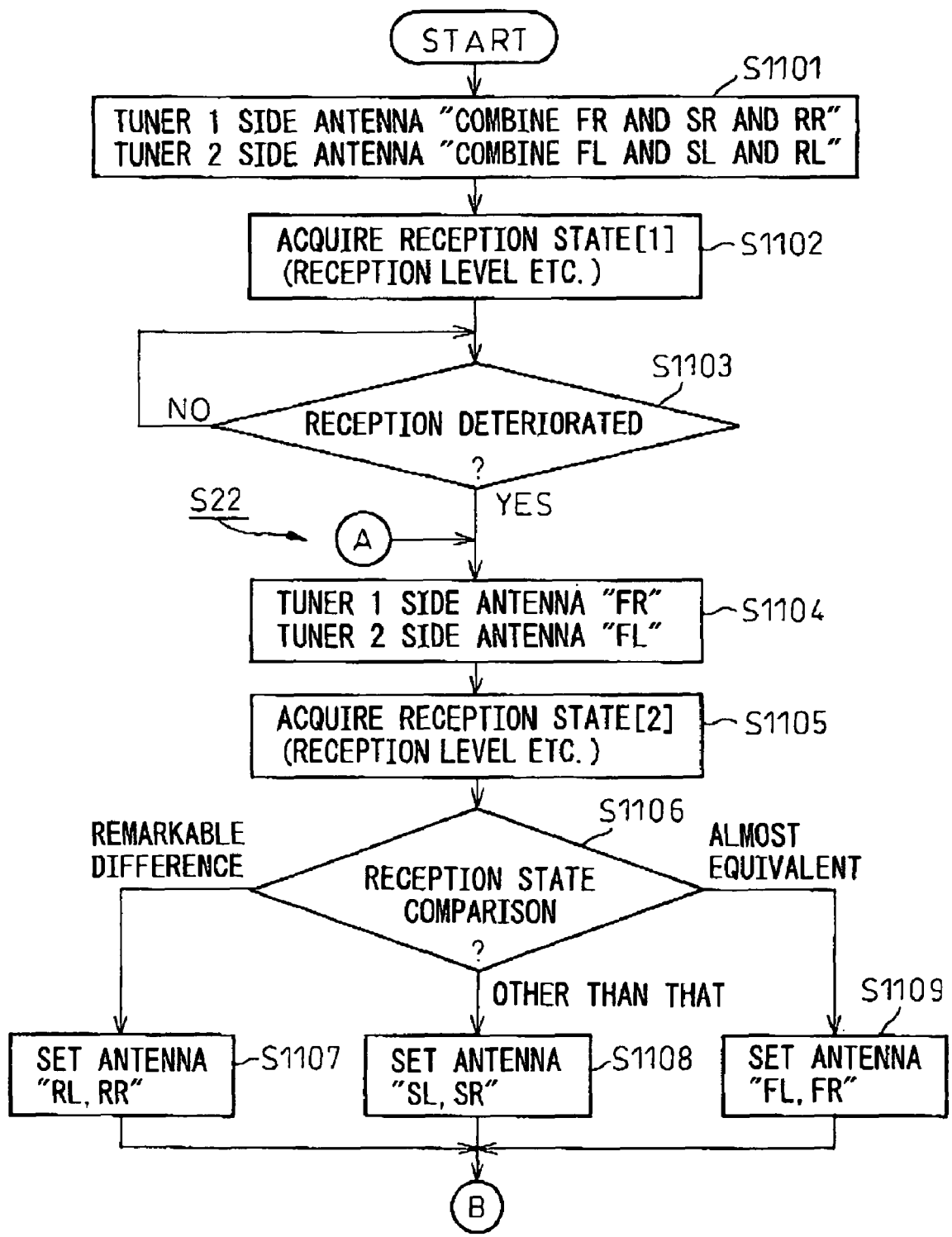
FIG. 19 is a flow chart of an 11th embodiment of the present invention.

FIG. 19 shows an 11th embodiment of the present invention.

This example is a modification of the fifth embodiment shown in FIG. 12. Here, in the reception environment before the start of the processing of the present invention, first, three antennas on both of the tuner 1 side and the tuner 2 side are combined and set for nondirectivity (S1191), and the states of reception of the radio wave are acquired in that state (S1102). In this case, the reception sensitivity at the time of the setting nondirectivity can be further improved by utilizing the frequency division diversity using three antennas.

When detecting deterioration of the reception (S1103), next the tuner 1 side (system 1 side) is switched to the front beam antenna FR (21A), and the tuner 2 side (system 2 side) is switched to the front beam antenna FL (22A) in the same way as the above (S0504). In this state, the tuners 1 and 2 (24-1 and 24-2) detect the states of reception (S1105) and compare the overall reception level (S1105) detected at the tuner 1 and the tuner 2 and the state of reception (S1102) before the start of the present control (S1106).

For example, when the reception level of the radio wave from the front of the vehicle is "1" and the reception level from the rear and side directions of the vehicle is "0", the sum of the reception levels of the tuners 1 and 2 before the detection becomes "2" and the sum of the reception levels of the tuners 1 and 2 after the detection becomes "2". Further, when the reception level from the rear of the vehicle is "1" and the reception level from the front and side directions of the vehicle is "0", the former becomes "2" and the latter becomes "0". Further, when the reception level from the right side direction of the vehicle is "1" and the reception level from the front and rear directions of the vehicle and from the left side direction of the vehicle is "0", the former becomes "1" and the latter becomes As a result, when the difference of the reception levels of the two is large (the former is "2" and the latter is "0"), it is judged that the radio wave is being received from the rear of the vehicle and the rear beam antenna RR (21B) at the tuner 1 side and the rear beam antenna RL (22B) at the tuner 2 side are immediately switched to (S1107). Further, when they are at levels substantially equivalent to each other (the former is "2" and the latter is "2"), it is judged that the radio wave is being received from the front of the vehicle and the present antenna settings are maintained (S1109). In a case other than that (the former is "1" and the latter is "0"), it is judged that the radio wave from the side direction is received and the side beam antenna SR (21C) at the tuner 1 side and the side beam antenna SL (22C) at the tuner 2 side are switched to (S1108).

In this example, frequency division diversity can be used without regard to whether it is before or after the start of the detection, so the reception sensitivity at the time of setting a nondirectional antenna and at the time of detection can be further improved. As another aspect of this example, it is also possible to switch antennas of both of the tuner 1 side and the tuner 2 side at the time of the detection to the rear beam antennas RR (21B) and RL (22B).

Figure 20:
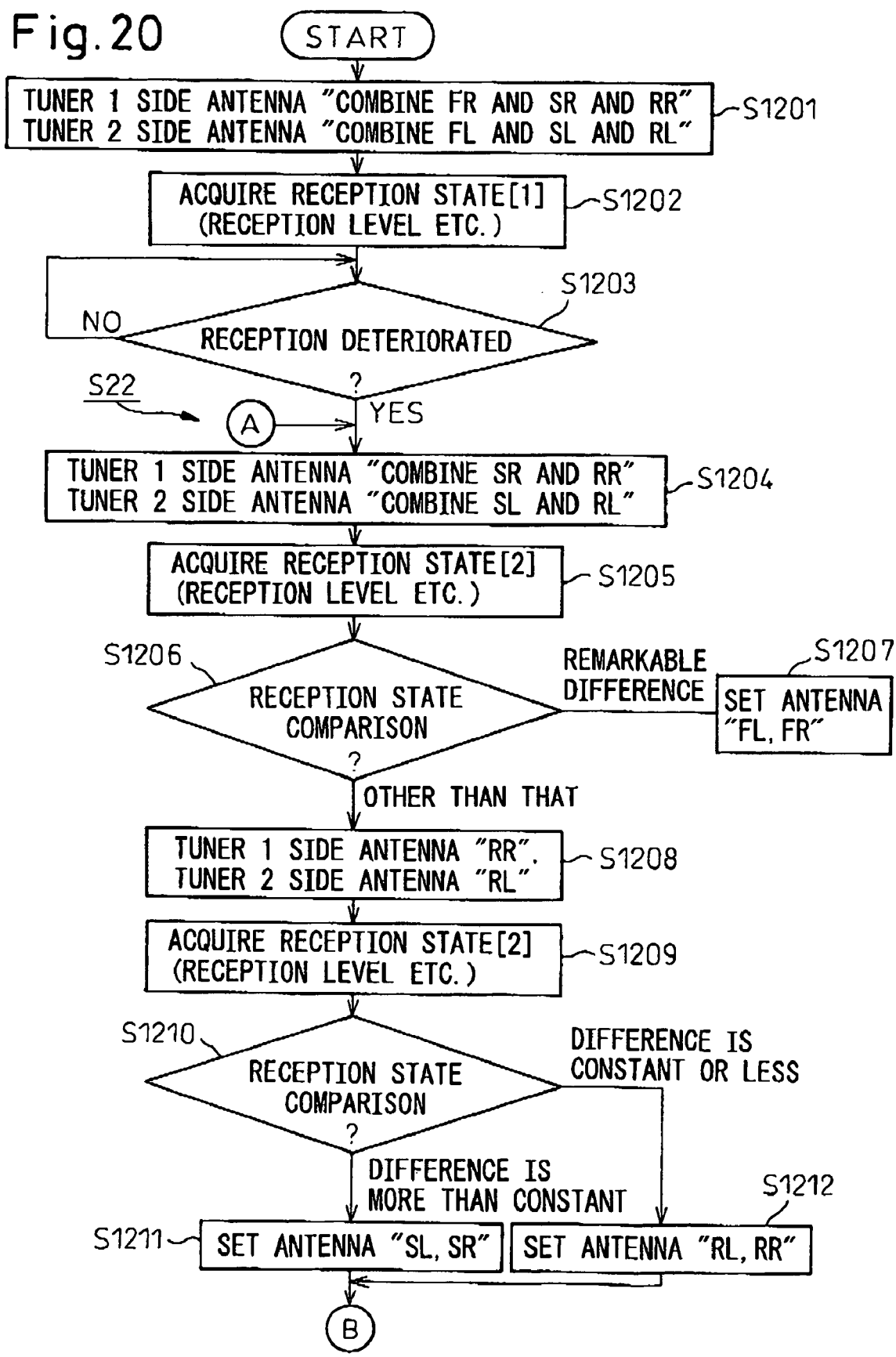
FIG. 20 is a flow chart of a 12th embodiment of the present invention.

FIG. 20 shows a 12th embodiment of the present invention.

This example is a modification of the 11th embodiment. The settings etc. of the antennas in the reception environment before the start of the processing of the present invention are the same as those of FIG. 19 (S1201 to 1202). In this example as well, the reception sensitivity at the time of setting to nondirectivity is improved by utilizing frequency division diversity using three antennas.

When detecting deterioration of the reception (S1203), the tuner 1 side omits the front beam antenna FR (21A) and combines the side and rear beam antennas 3R (21C) and RR (21B), while the tuner 2 side omits the front beam antenna FL (22A) and combines the side and rear beam antennas SL (22C) and RL (22B) in the same way as the above (S1204).

In this state, the tuners 1 and 2 detect the states of reception and compare the overall reception level detected at the tuner 1 and the tuner 2 (S1205) and the state of reception before the start of the present control (S1202) (S1206).

As a result, when the difference of the reception levels of the two is large, it is judged that the radio wave is being received from the front of the vehicle and the front beam antenna FR (21A) at the tuner 1 side and the front beam antenna FL (22A) at the tuner 2 side are switched to (S1207). In the case of the radio wave reception from the side direction or the rear direction not satisfying this condition, next, each of the tuner 1 side and the tuner 2 side is switched to only the rear beam antennas RR (21B) and RL (22B) (S1208).

In this state, the overall reception level detected at the tuner 1 and the tuner 2 (31205) and the state of reception before the start of the present control (S1202) are compared (31206). As a result, when the difference is a constant value or less (substantially equal), it is judged that the radio wave is being received from the front of the vehicle, and the rear beam antenna RR (21B) at the tuner 1 side and the rear beam antenna RL (22B) at the tuner 2 side are switched to (S1212).

Conversely, when the difference is the constant value or more, it is judged that the radio wave is being received from the side direction of the vehicle, and the side beam antenna SR (21C) at the tuner 1 side and the side beam antenna SL (22C) at the tuner 2 side are switched to (S1211).

In this example as well, frequency division diversity can be utilized both before and after the start of the detection, so the reception sensitivity can be further improved. Further, it is also possible to combine the beam antennas in the side direction and the front direction at step S1204. In that case, the front beam antenna is switched to at step S1208.

Next, an explanation will be given of embodiments for achieving the second object of the present invention.

Figure 21:
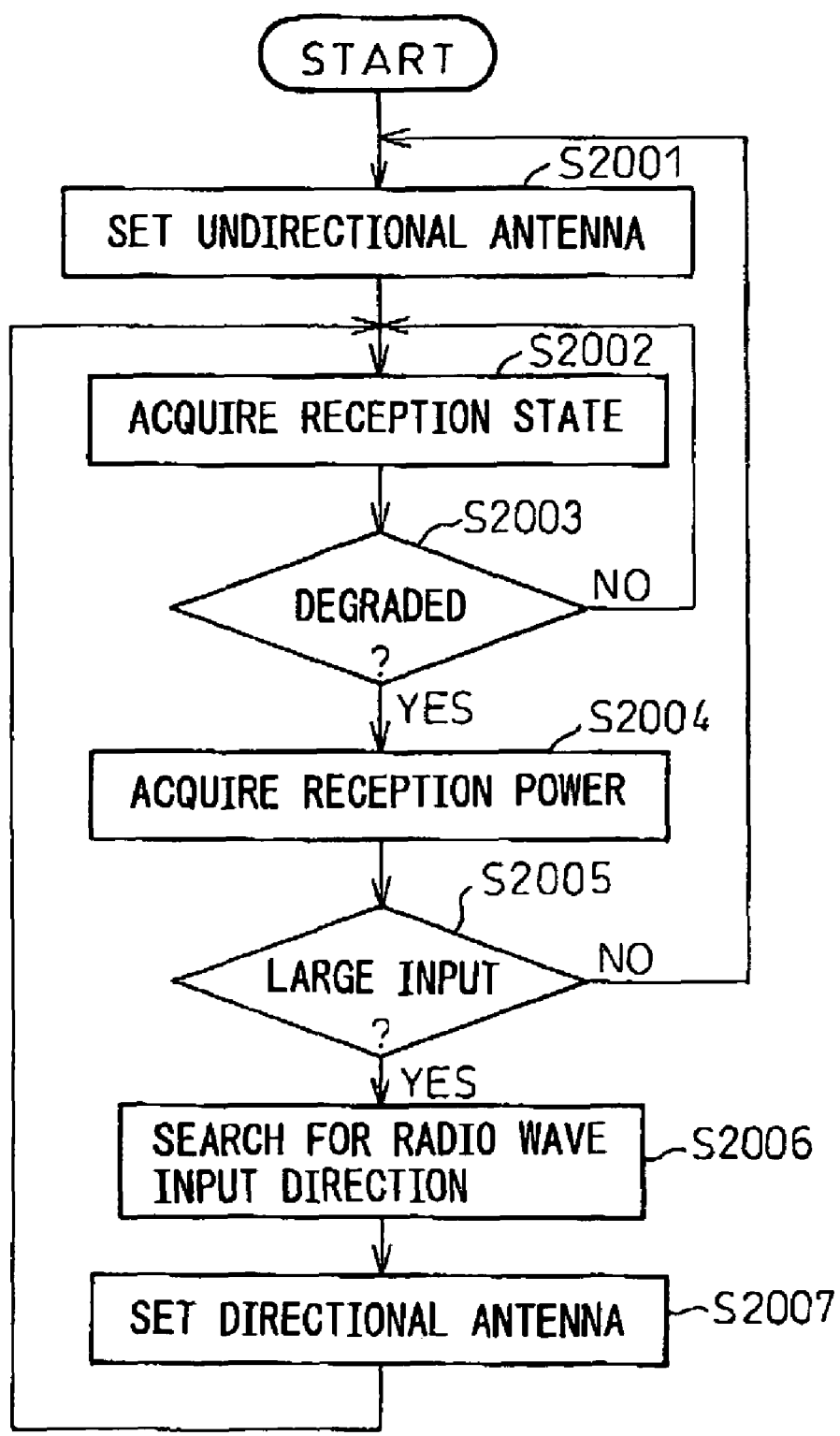
FIG. 21 is a flow chart of a 13th embodiment of the present invention.
Figure 22:
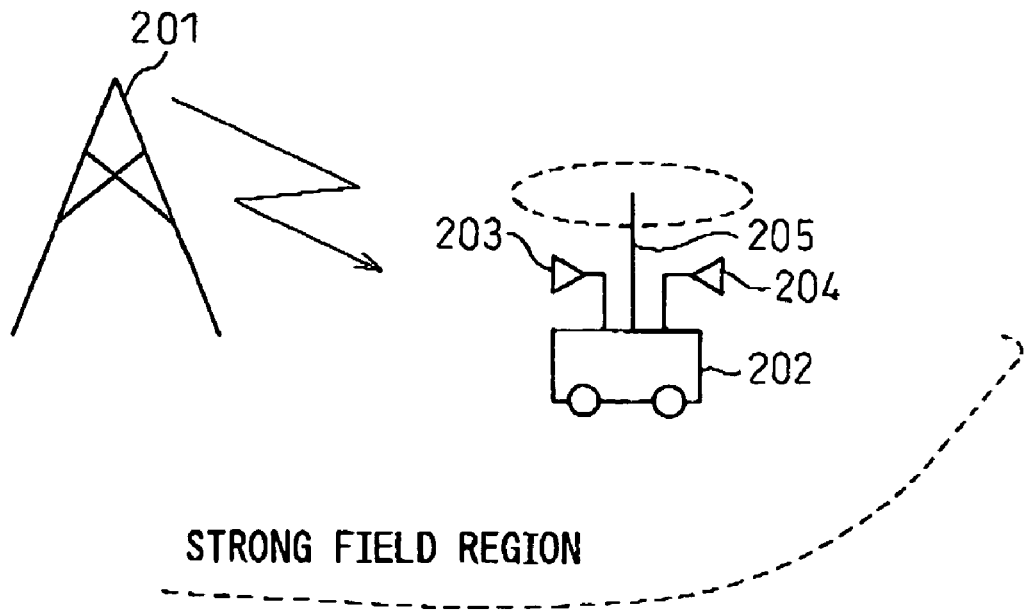
FIG. 22 is a diagram showing an example of operation (1) of FIG. 21.
Figure 23:
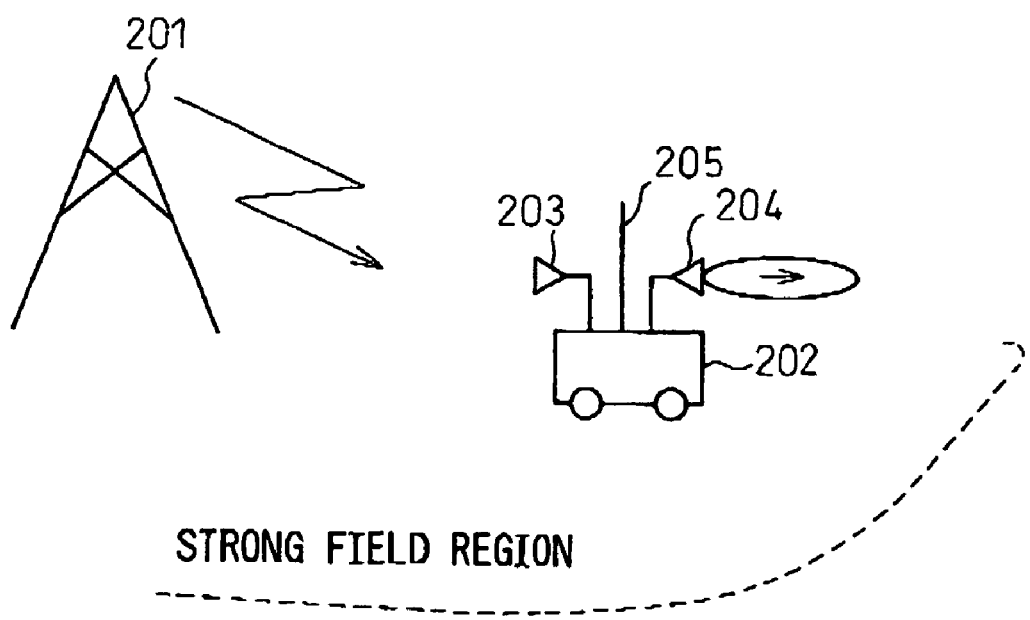
FIG. 23 is a diagram showing an example of operation (2) of FIG. 21.

FIG. 21 show a 13th embodiment of the present invention. This shows an example of a flow of control for switching antennas for achieving the second object of the present invention. FIG. 22 and FIG. 23 show an example of the operation of FIG. 21. Note that the vehicle 202 of FIG. 22 and FIG. 23 has a vehicular antenna configuration provided with both a nondirectional antenna 205 and front and rear beam antennas 203 and 204.

In FIG. 21, a moving vehicle 202 set to the nondirectional antenna 205 (S2001) enters the strong field of a digital television broadcast signal near a radio tower 201 (FIG. 22). The vehicle 202 monitors the state of reception of the radio wave at a constant cycle of for example intervals of several seconds (S2002) and judges the deterioration of the state of reception of the radio wave acquired for each cycle (S2003). For judgment of the deterioration of this state of reception, use is made of for example the error rate information mentioned before.

When it is judged that the state of reception is not deteriorated ("N" of S2003), the vehicle continues the monitoring as it is (S2002). On the other hand, when it is judged that the state of reception is deteriorated ("Y" of S2002), in order to judge whether or not the cause of the deterioration is radio wave reception in a strong field (S2005), next the reception power is measured (S2004).

When the reception level of the radio wave is a predetermined reference value or less, it is judged that the reception power is not excessive (within a permissible range) ("N" of S2005), and the monitoring is continued without switching from the nondirectional antenna 205 (S2001 and S2002). On the other hand, when the reception power of the digital television broadcast signal is large, for example near the radio tower 201, and the reception level thereof exceeds the predetermined reference value, it is judged that the deterioration of the state of reception is due to the excessive reception level ("Y" of S2005), and a search of the direction of input of the radio wave is started in order to determine the directional antenna 203 or 204 to be set next (S2006)

Based on the results of the search, the directional antenna giving a reception level of the predetermined reference value or less (within the permissible range) is selected (S2007). In the example of FIG. 23, the rear beam antenna 204 having a reception level not more than the predetermined reference value is switched to.

Figure 24:
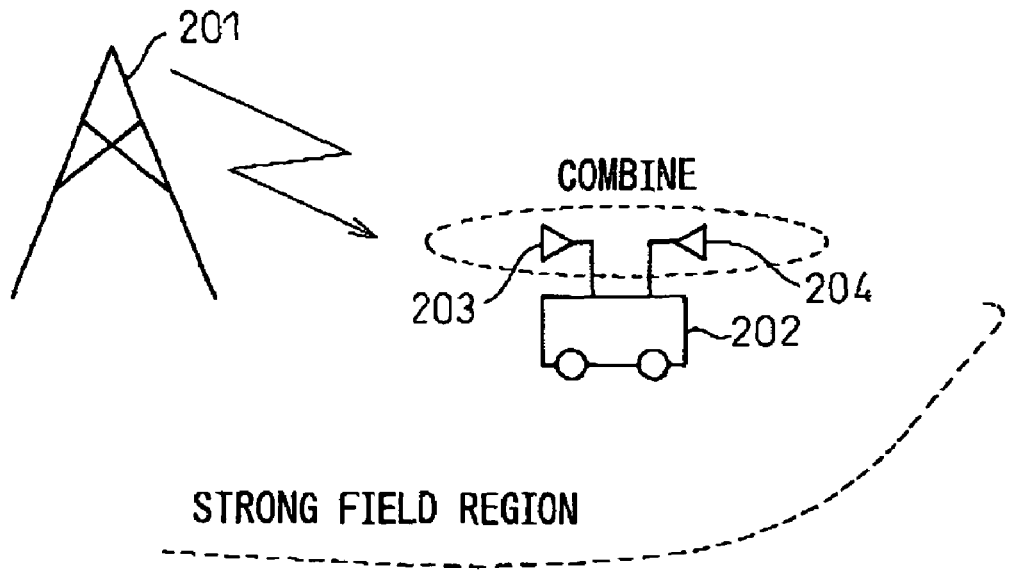
FIG. 24 is a diagram showing another example of operation (1) of FIG. 21.
Figure 25:
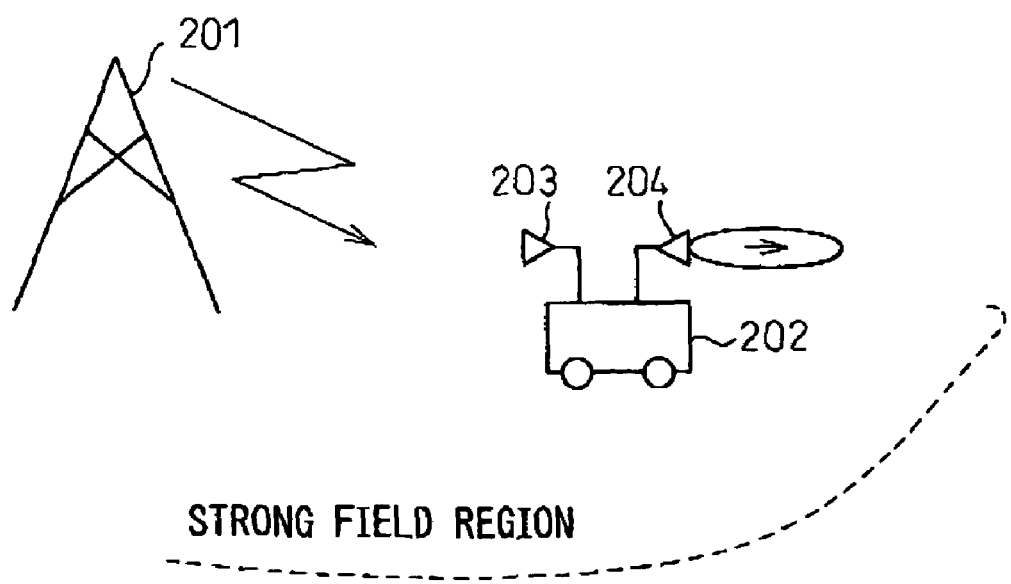
FIG. 25 is a diagram showing another example of operation (2) of FIG. 21.

FIG. 24 and FIG. 25 show another aspect of the flow of control for antenna switching mentioned above. In this example, in place of the nondirectional antenna 205 of FIGS. 22 and 23, use is made of a nondirectional antenna configured by combining the beam antennas 203 and 204. This example will be explained by using the specific example of configuration of FIG. 6.

First, the antenna switching/combining circuit 59 of the moving vehicle 202 of FIG. 24 sets the switches 33 and 43 to the combining operation (S2001) and searches for the direction of input of the radio wave by a nondirectional antenna combining the front and rear beam antennas 32A-32B and 42A-42B (corresponding to the beam antennas 203 and 204 of this example).

The antenna switching/combining circuit 59 judges the state of deterioration of the reception (S2003) by acquiring for example the error rate information from the error correction unit 52 at a constant cycle (S2002). When the acquired error rate is a predetermined reference value or less, the acquisition of the error rate information is repeated at a constant cycle as it is ("N" of S2003). When the moving vehicle 202 then enters a strong field and the error rate exceeds the predetermined reference value ("Y" of S2003), the reception power at that point of time is judged (S2004) by the reception power information from the level detection unit 36 and/or 46. When the reception power is the predetermined reference value or less, it is judged that the cause of deterioration of the reception is a reason other than the control target of this example, and the operation returns to the initial state ("N" of S2005 and S2001).

On the other hand, when the reception power exceeds the predetermined reference value, it is judged that the cause of deterioration of the reception is the excessive radio wave input ("Y" of S2005), and, for searching for the direction of input of the radio wave, the antenna switching/combining circuit 59 instructs the switches 33 and 43 so as to successively switch to the individual beam antennas 32A-32B and 42A-42B (S2006).

From the results of the search of the direction of input of the radio wave, the antenna switching/combining circuit 59 selects the beam antenna giving a reception level of the predetermined reference value or less (within the permissible range) and instructs the switch 33 and/or 34 to set it (S2007). In the example of FIG. 25, the rear beam antenna 204 giving a reception level of the predetermined reference value or less is set. In this way, in this example, there is the advantage that the nondirectional antenna 205 of FIGS. 22 and 23 becomes unnecessary.

Figure 26:
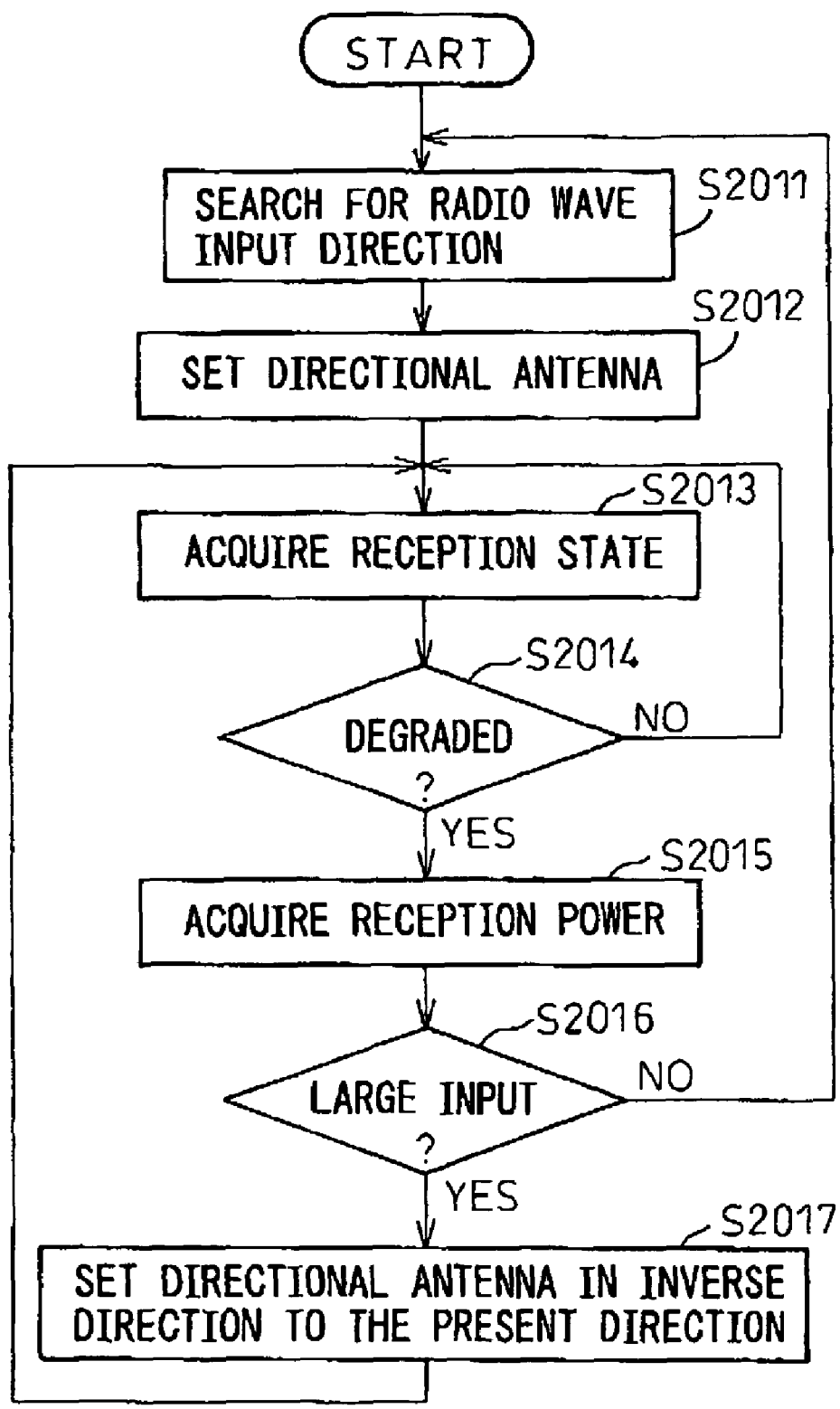
FIG. 26 is a flow chart of a 14th embodiment of the present invention.
Figure 27:
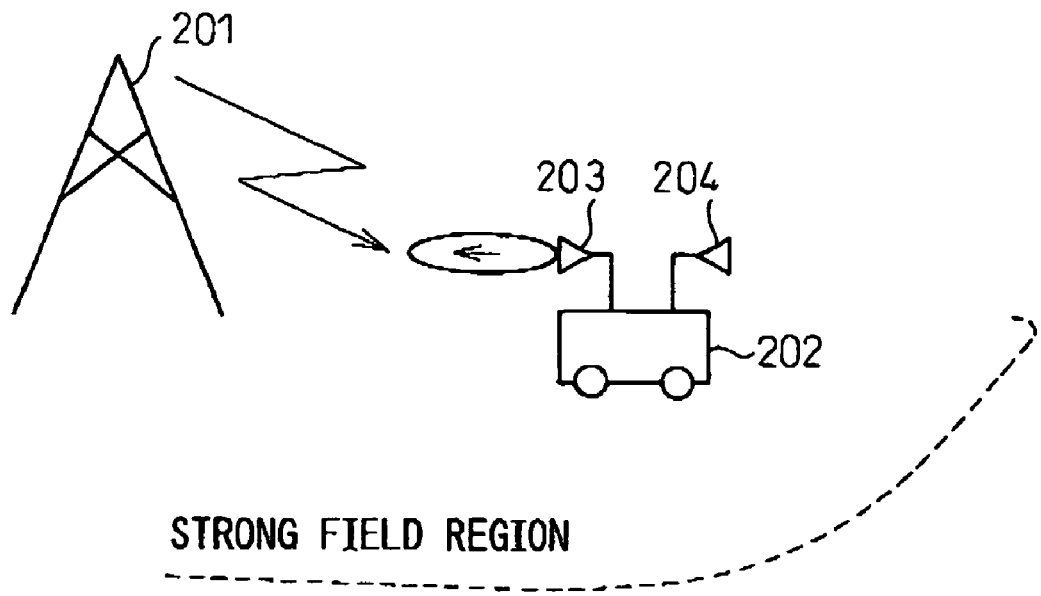
FIG. 27 is a diagram showing an example of operation (1) of FIG. 26.
Figure 28:
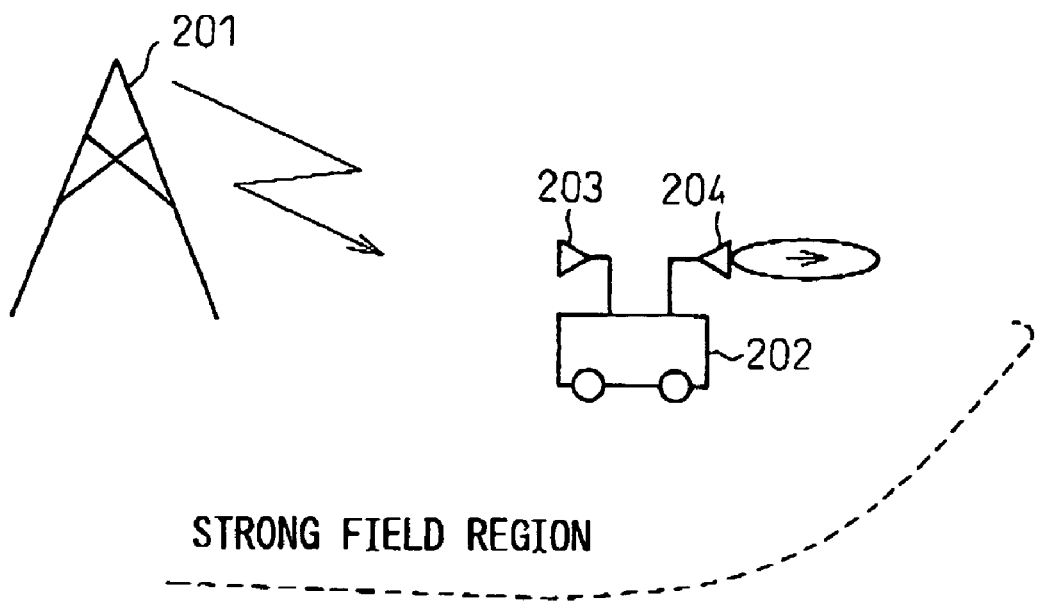
FIG. 28 is a diagram showing an example of operation (2) of FIG. 26.

FIG. 26 shows a 14th embodiment of the present invention. This shows an example of another flow of control of antenna switching for achieving the second object of the present invention. FIGS. 27 and 28 show an example of the operation of FIG. 26. In this example, only the switching control of the beam antennas 203 and 204 is carried out. Here too, the specific configuration of FIG. 6 is used to explain the operation.

The antenna switching/combining circuit 59 of the moving vehicle 202 of FIG. 27 controls the switches 33 and 43 to successively switch to the individual beam antennas 32A-32B and 42A-42B and search for the input direction of the radio wave (S2011). Then, in the same way as the prior art, the beam antenna having the largest reception level (the front beam antenna 203 in the example of FIG. 27) is selected (S2012). In this state, the antenna switching/combining circuit 59 acquires for example the error rate information from the error correction unit 52 and judges the state of deterioration of the reception at each constant cycle (S2013 and S2014). When the acquired error rate is a predetermined reference value or less, the acquisition of the error rate information is repeated at a constant cycle as it is ("N" of S2014).

When the moving vehicle 202 enters a strong field and the reception error rate exceeds the predetermined reference value ("Y" of S2014), next, the reception power at that point of time is judged by the reception power information from the level detection unit 36 and/or 46 (S2015 and S2016). When the reception power is the predetermined reference value or less, it is judged that the cause of deterioration of the reception is a reason other than the control target of this example, and the operation returns to the initial state ("N" of S2016 and S2011). On the other hand, when the reception power exceeds the predetermined reference value, it is judged that the cause of deterioration of the reception is the excessive radio wave input ("Y" of S2016), and, in this example, the beam antenna (the rear beam antenna 204 of FIG. 28) in the inverse direction to the present setting (the front beam antenna 203 of FIG. 26) is immediately selected and the setting thereof instructed to the switches 33 and 34 (S2017).

In this way, according to this example, from the time of detection of deterioration of the reception due to excessive input, it becomes possible to immediately select the directional antenna in the inverse direction and restore the state of reception.

Next, embodiments for achieving the third object of the present invention will be explained.

In this explanation, the configuration of the present invention will be explained by taking the switch 33 of FIG. 6 as an example, but it is clear that the present invention can also be applied to the switch 43 in the same way.

Figure 4A:
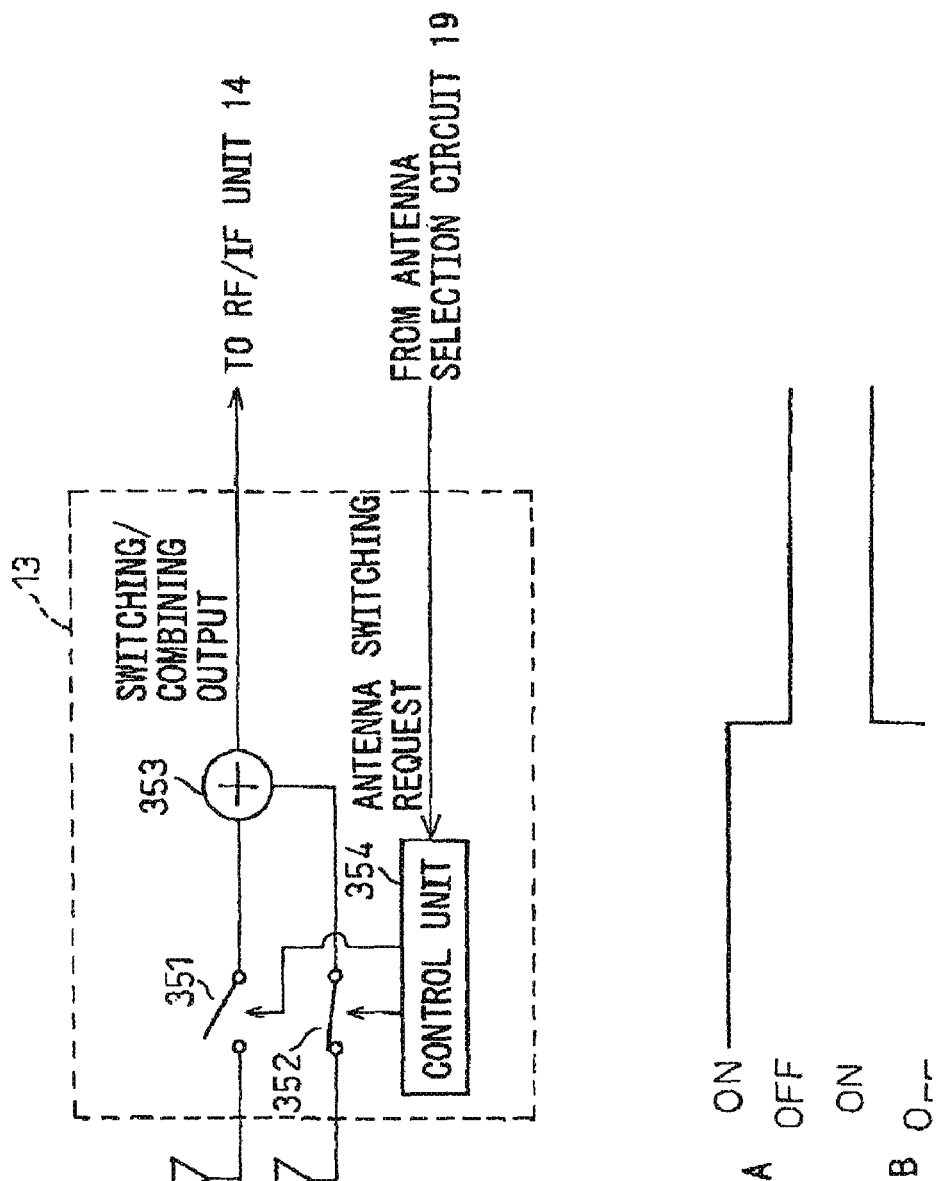
FIG. 4A is a diagram of an example of a conventional switch configuration.
Figure 29:
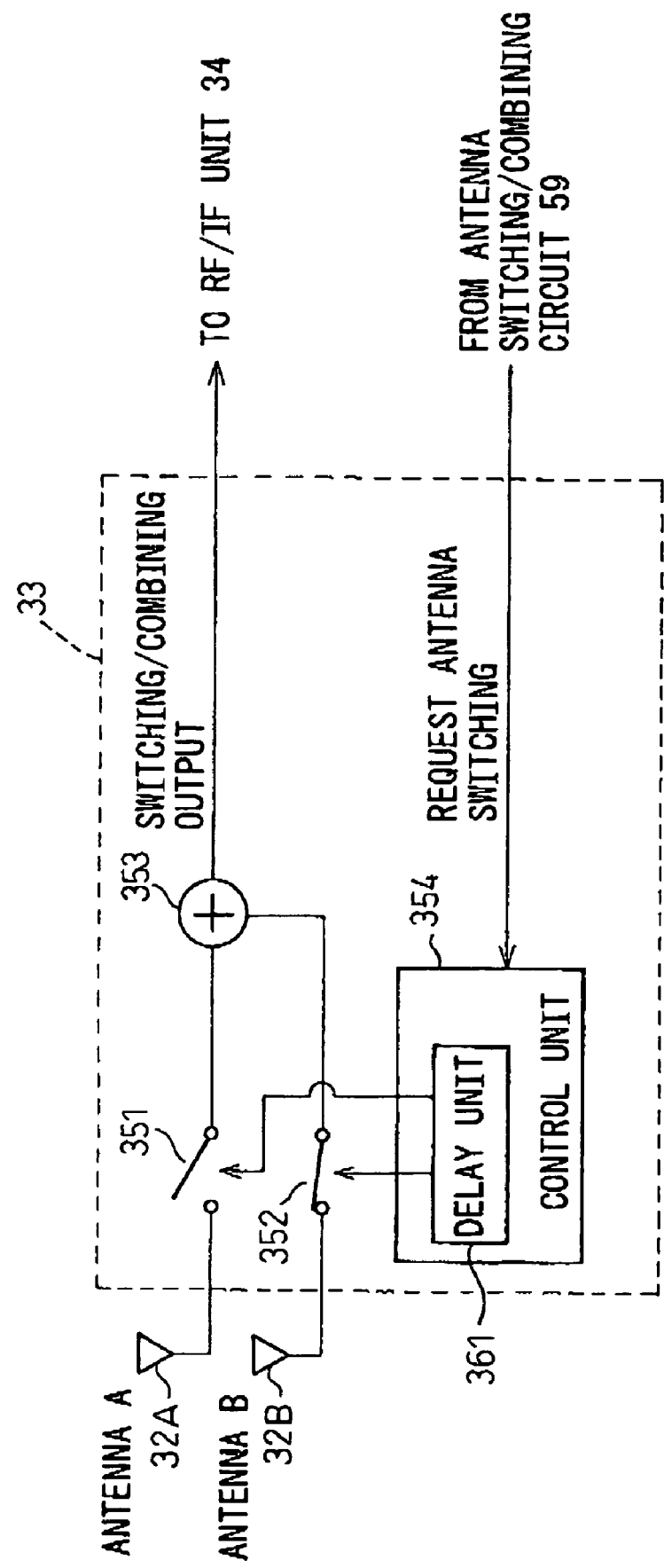
FIG. 29 is a diagram showing a 15th embodiment of the present invention.

FIG. 29 shows a 15th embodiment of the present invention. Further, FIGS. 30A and 30B show an example of the basic switch operation of FIG. 29. This example is the same as the conventional example of FIG. 4 except that a delay unit 361 is added to the control unit 354 and the reception signal from the antenna A (front beam antenna) 32A and/or antenna B (rear beam antenna) 32B is output via the combining unit 353.

Figure 4B:
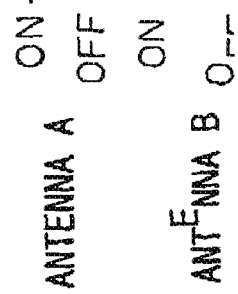
FIG. 4B is a diagram of an example of the operation of a conventional switch.

First, the operation of the delay unit 361 will be explained while referring to FIGS. 30A and 30B5. Upon receiving an antenna switching request signal (switching from antenna A (32A) to antenna B (328) in this example) from the antenna switching/combining circuit 59, an on/off control signal of the switches 351 and 352 shown in FIG. 4B is generated inside the control unit 354.

In the case of FIG. 30A of this example, the control signal for switching the antenna A from on to off is delayed by exactly a predetermined time t by the delay unit 361. By this, during the period of the delay time t, the reception signals of both of the antennas 21A and 21B are input to the combining unit 353, and their combined signal is output. Such processing becomes more advantageous in the case where the reception power of the antenna B receiving the radio wave from the rear direction is larger than the reception power of the antenna A receiving the radio wave from the front direction.

In this case, by generating a combined signal exactly during the delay time t, the time until the control for increasing the reception power of the AGC circuit and the rising transition response characteristic of the later RF/IF filter are stabilized is controlled so that the time becomes shorter and the difference of the reception levels between before and after switching the antennas becomes smaller. As a result, after the elapse of the delay time t, a smooth shift from the small reception power of the antenna A to the large reception power of the antenna B becomes possible.

On the other hand, in the case of FIG. 30B, the control signal for switching the antenna B from off to on is delayed by exactly the predetermined time t by the delay unit 361. By this, during the period of the delay time t, the input of both of the reception signals of the antennas A and B to the combining unit 53 is stopped. Such processing becomes advantageous when the reception power of the antenna B receiving the radio wave from the rear direction is smaller than the reception power of the antenna A receiving the radio wave from the front direction.

In this case, by making the output from the combining unit 353 signal-free exactly during the delay time t, the time until the control for reducing the reception power of the AGC circuit and the falling transition response characteristic of the RF/IF filter of the latter stage are stabilized is controlled so that the time becomes shorter and the difference of the reception levels between before and after switching the antennas becomes smaller. As a result, after the elapse of the delay time t, a smooth shift from the large reception power of the antenna A to the small reception power of the antenna B becomes possible.

Figure 31:
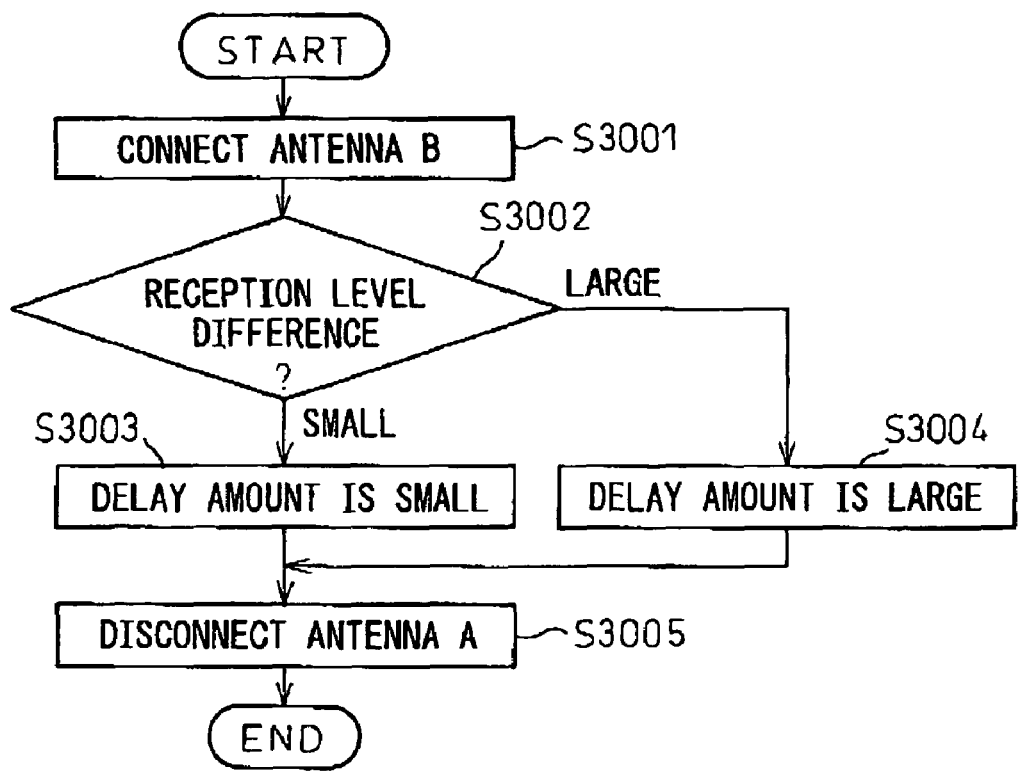
FIG. 31 is a flow chart of an example of the switch control of FIGS. 30A and 30B.

FIG. 31 shows an example of the flow of switch control of FIGS. 30A and 30B.

In this example, in accordance with the magnitude of the difference of the reception levels before and after switching the antennas, the amount of the delay time at the time of the combining operation is switched. Here too, an explanation is given of the case of switching from the antenna A to the antenna B, but the same also applies to switching in the inverse direction to that.

In this example, when switching from the antenna A to the antenna B (S3001), the level difference $|\alpha-\beta|$ between the reception level ($\alpha$) of the antenna A before switching the antenna and the reception level ($\beta$) of the antenna B after switching is found (S3002). When the level difference is smaller than a predetermined reference value, the delay time of the delay unit 361 is set short (S3003), while conversely when the level difference is larger, the delay time of the delay unit 361 is set large (S3004). The antenna A is disconnected after the elapse of the set delay time (S3005).

According to this example, in accordance with the level difference before and after switching the antennas, the time until the control for increasing the reception power of the AGC circuit and the rising transition response characteristic of the later RF/IF filter are stabilized is further shortened. On the other hand, when the delay time t is set longer than required, the difference of the reception levels before and after switching the antennas will conversely increase. Therefore, by setting the delay time short when the level difference is smaller than a predetermined reference value and conversely by setting the delay time long when the level difference is larger, the suitable time is adjusted to.

Note that, in this example and the next example (FIG. 32), only the combining operation is explained. This is because, in actual use, the antenna switching/combining operation is performed so the reception level after switching the antennas becomes larger. However, for example, it is also possible if the reception level is previously searched for for each of the antennas A and B and the delay time of disconnection (FIG. 30B) is set based on the difference of the reception levels (predicted value) in the same way as this example.

Figure 32:
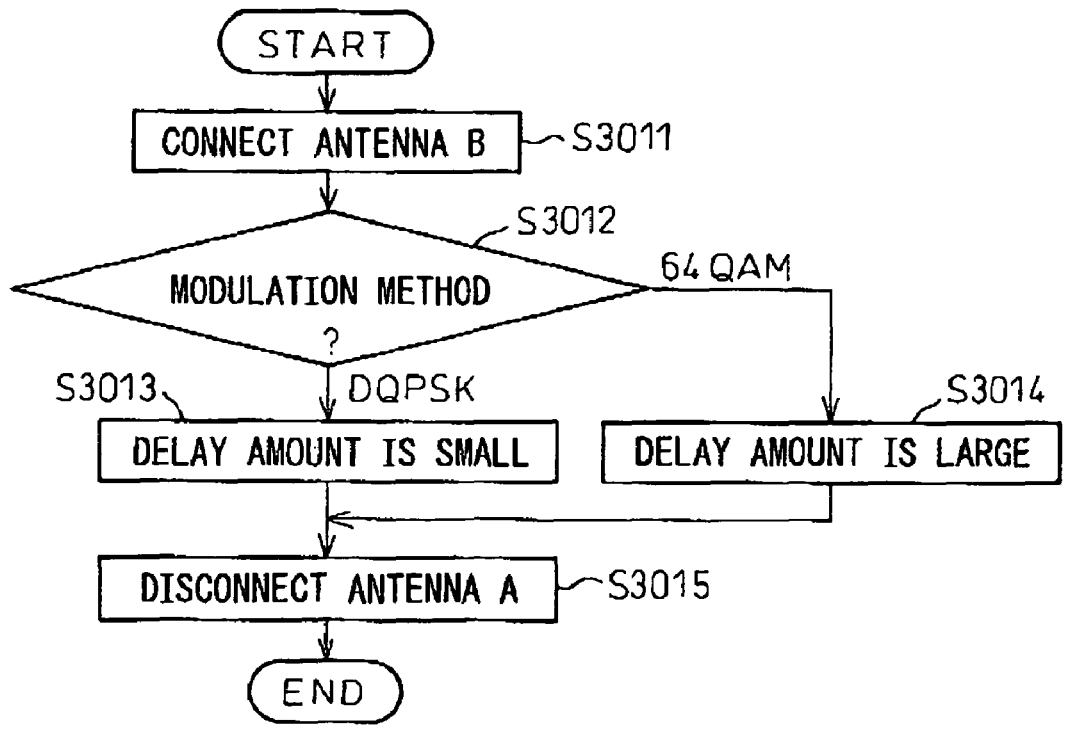
FIG. 32 is a flow chart of another example of the switch control of FIGS. 30A and 30B.

FIG. 32 shows another example of the flow of switch control of FIGS. 30A and 30B. In this example, the signal modulation scheme is discriminated from the broadcast parameters included in the received radio wave and a delay time in accordance with the signal modulation scheme is set.

First, when switching from the antenna A to the antenna B (S3011), the signal modulation scheme after switching the antenna is discriminated (S3012). When the signal modulation scheme is DQPSK, which is resistant to noise and enables detection of synchronization in a short time, the delay time of the delay unit 361 is set short (S3013). Conversely in the case of a 64 QAM signal, which is weak against noise and takes a long time for detection of synchronization, the delay time is set long (S3014). After the elapse of the set delay time, the antenna 21A is disconnected (S3015). This example can be used in combination with the example of FIG. 31 as well. In this example, since a delay time in accordance with the signal modulation scheme can be set, a more suitable shortening of the antenna switching time is achieved.

FIG. 33 shows a 16th embodiment of the present invention. Further, FIGS. 34A to 34C shown an example of the basic operation of FIG. 33.

In FIG. 33, an amplifier A (371A) and an attenuator A (372A) are inserted into a communication path of the antenna A. Further, an amplifier B (371B) and an attenuator B (372B) are inserted into a communication path of the antenna B. Further, an amplification control unit 362 for controlling the amplification rates of the amplifiers A and B, an attenuation control unit 363 for controlling the attenuation rates of the attenuators A and B, and further a combining control unit 364 for controlling the combining ratio of the combining unit 353 are provided in the control unit 354.

In this example, by using at least one of the amplifier, attenuator, and combining unit provided in each communication path in place of the switches 351 and 352 and the delay unit 361 for controlling the switching time in the 15th embodiment, a gentler level change of the reception signal on each communication path (gentler switching of the reception signal) is realized.

Figure 34A:
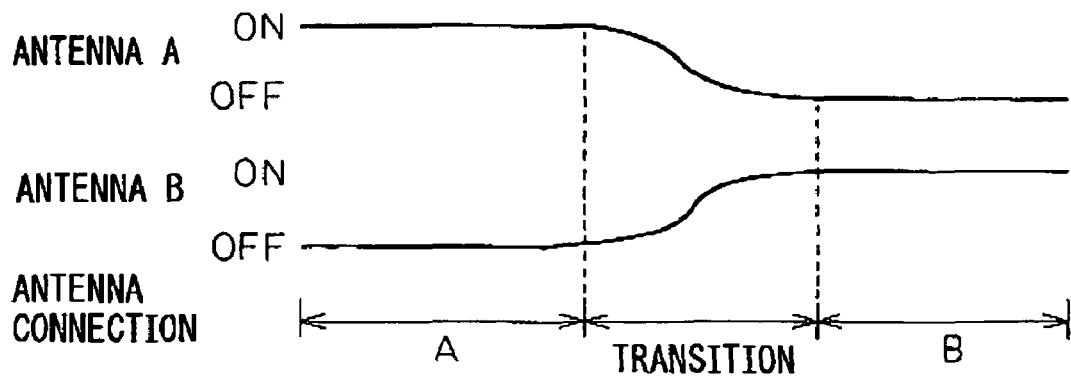
FIG. 34A is a diagram showing an example of operation (1) of FIG. 33.
Figure 34B:
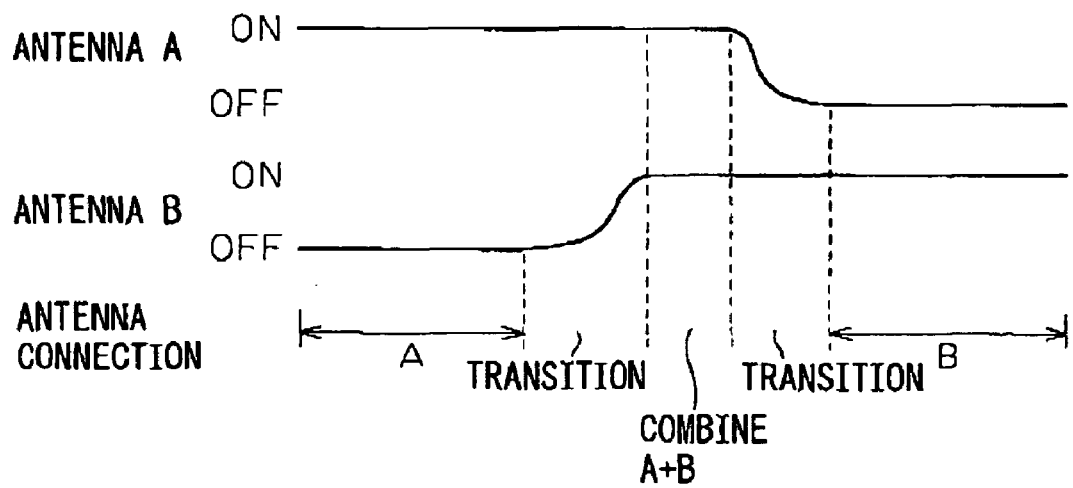
FIG. 34B is a diagram showing an example of operation (2) of FIG. 33.
Figure 34C:
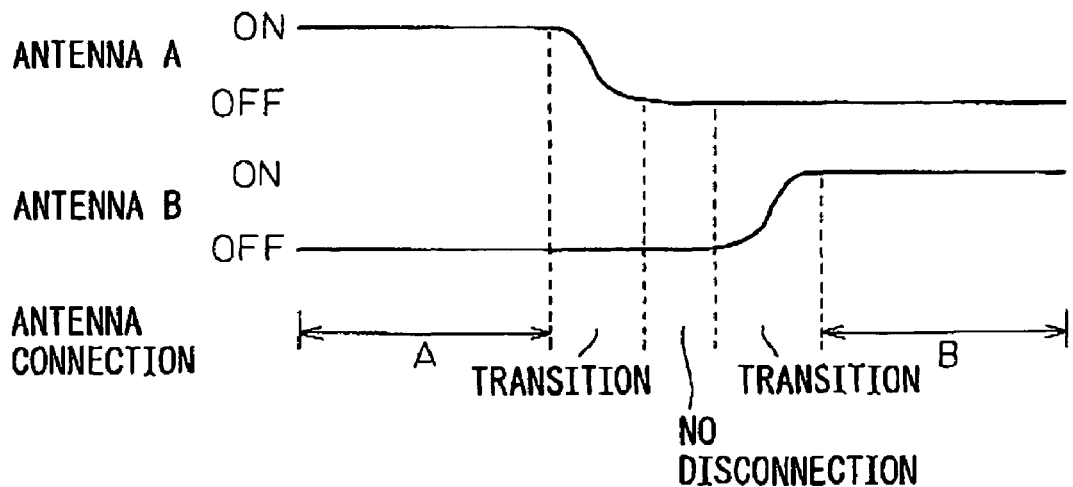
FIG. 34C is a diagram showing an example of operation (3) of FIG. 33.

FIG. 34A shows an example of simultaneously gently switching both of the antenna A and the antenna B. Explaining this operation by the configuration of FIG. 33, the gentler switching is realized by the amplification control unit 362 gradually reducing the amplification rate of the amplifier A on the antenna A side, while simultaneously gradually increasing the amplification rate of the amplifier B of the antenna B side in parallel to this.

In addition to this, the gentler switching may also be realized by the attenuation control unit 363 gradually increasing the attenuation rate of the attenuator A on the antenna A side, while simultaneously gradually reducing the attenuation rate of the attenuator B on the antenna B side in parallel to this or by the combining control unit 364 gradually reducing the combining ratio of the reception signal on the antenna A side and simultaneously gradually increasing the combining ratio of the reception signal on the antenna B side in parallel to this.

The above operation can be realized by the control of any one of the amplification rate, attenuation rate, and combining ratio, but it is also possible to appropriately combine them in order to obtain the optimum S/N. Further, it is also possible to realize the amplification control unit 362, the attenuation control unit 363, and the combining control unit 364 by software using a CPU circuit etc. of the control unit 354.

The example of the combining operation shown in FIG. 34B and the disconnection shown in FIG. 34C can be realized by imparting a time difference to the control of the amplification rate, attenuation rate, and combining ratio on each communication path mentioned above. In the example of the combining operation of FIG. 34B, the control at the antenna A side is delayed by a predetermined time, while in the example of the disconnection of FIG. 34C, the control at the antenna B side is delayed by a predetermined time.

In this example, the level of the reception power is gently changed including also near before and after the switching of the antenna (transition region). By this, the trackability of the AGC circuit is improved, and the generation of impulse noise at the time of the transition response of the RF/IF filter is remarkably reduced. Further, by suitably adjusting/varying the amount of gentle change of the reception power, a smooth shift of the reception power before and after switching the antennas can be reliably achieved.

FIG. 35A and FIG. 35B show another aspect of FIG. 34A.

In FIG. 35A, the amplification rate, attenuation rate and/or combining ratio are stepwise changed by software control using a CPU circuit etc. of the control unit 354 or stepwise control data etc. at a constant cycle given from the external antenna switching/combining circuit 59. In this example, the reception level can be more precisely controlled by using a digital amplifier and digital attenuator able to stepwise control the gain and attenuation according to the set data. Note that, in the example of FIG. 35A, the antennas A and B are step-controlled at the same timing for each step, but it is also possible to alternately control the antennas A and B for each step in order to reduce the processing load of the step control.

Figure 36:
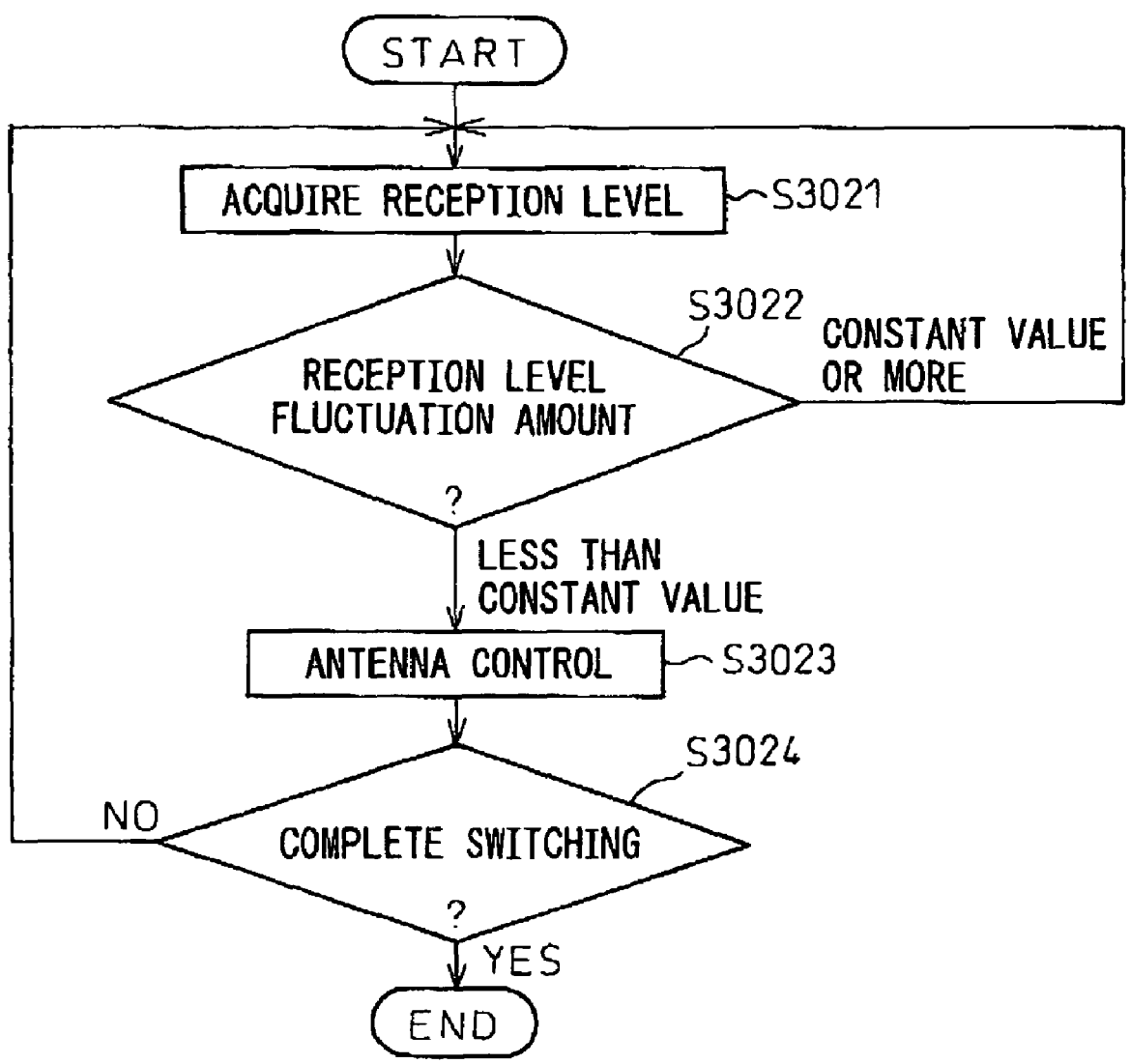
FIG. 36 is a flow chart of an example of the control of FIG. 35B.

FIG. 35B shows another aspect of FIG. 35A, and FIG. 36 shows an example of the control flow thereof. In this example, the control for switching antennas is suitably executed while monitoring the gently changing reception level in real time.

In FIG. 36, by monitoring at a predetermined cycle ($\Delta t$), the reception level ($\alpha$) of the antenna A and the reception level ($\beta$) of the antenna B are acquired (S3021). When the amount of fluctuation of the reception level ($\Delta\alpha$, $\Delta\beta$, or $\Delta|\alpha-\beta|$) is a predetermined reference value or more, it is judged that the signal is abnormal due to noise etc. and the monitoring of the reception level is continued as it is (S3022 and 3021). On the other hand, when the difference of the reception levels becomes smaller than the predetermined reference value, it is judged that the signal reception is normal and the various antenna controls as shown in FIGS. 34A to 34C are executed (S3023 to 3024). Note that, at step S3024, by switching the antennas at the point of time when the acquired difference of the reception levels ($\Delta|\alpha-\beta|$) between the antenna A and the antenna B becomes smaller than the predetermined reference value, the reception power can be reliably and smoothly shifted.

In this way, in this example, the switching of the antennas is suitably controlled while monitoring the gently or stepwise changing reception level in real time, therefore it becomes possible to reliably prevent the degradation of the state of reception at the time of switching the antennas.

Figure 37:
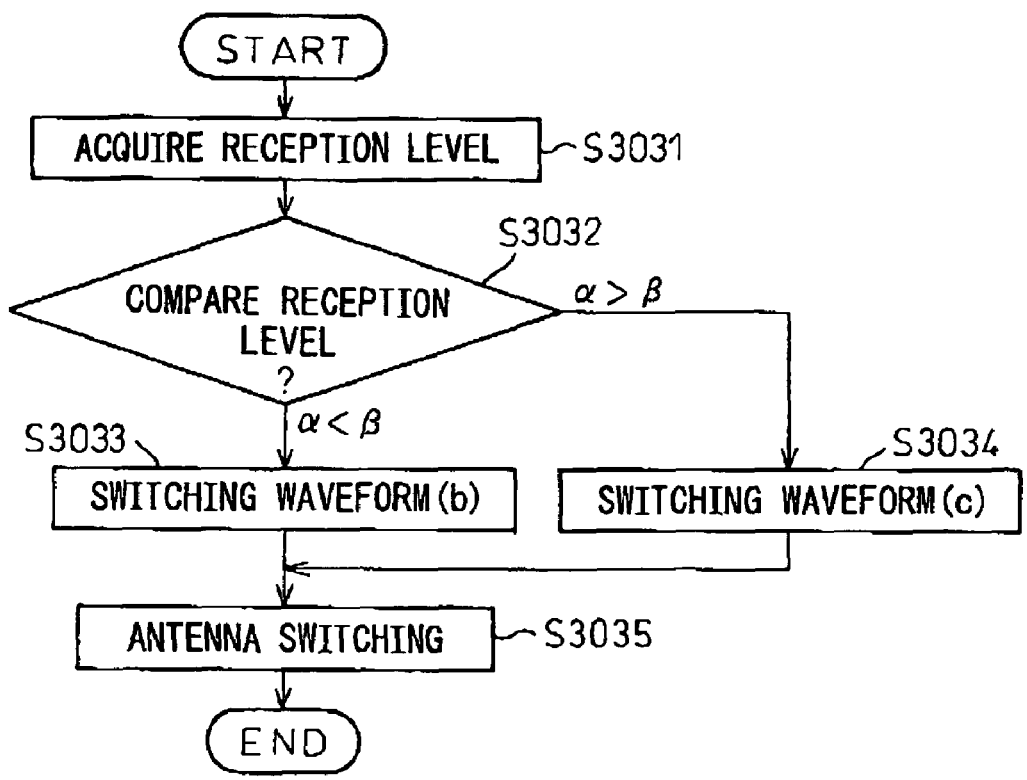
FIG. 37 is a flow chart of an example of switching waveform control.

FIG. 37 shows an example of the flow of judgment as to which waveform of FIG. 34B (combining) or FIG. 34C (disconnection) is to be used. As mentioned above, smooth switching of antennas is realized when a combining operation is used if the reception level after switching the antennas is larger and when disconnection is used if the reception level after switching the antennas is smaller.

In this example, utilizing this, by comparing the reception level ($\alpha$) of the antenna A and the reception level ($\beta$) of the antenna B (S3031 and 3032), the combining operation is selected when the reception level after switching the antennas is larger ($\alpha<\beta$). For this reason, the switching waveform (switching waveform (b)) of FIG. 34B is used (S3033). On the other hand, when the reception level after switching the antennas is smaller ($\alpha>\beta$), disconnection is selected. For this reason, the switching waveform of FIG. 34C (switching waveform (c)) is used (S3034).

Figure 38:
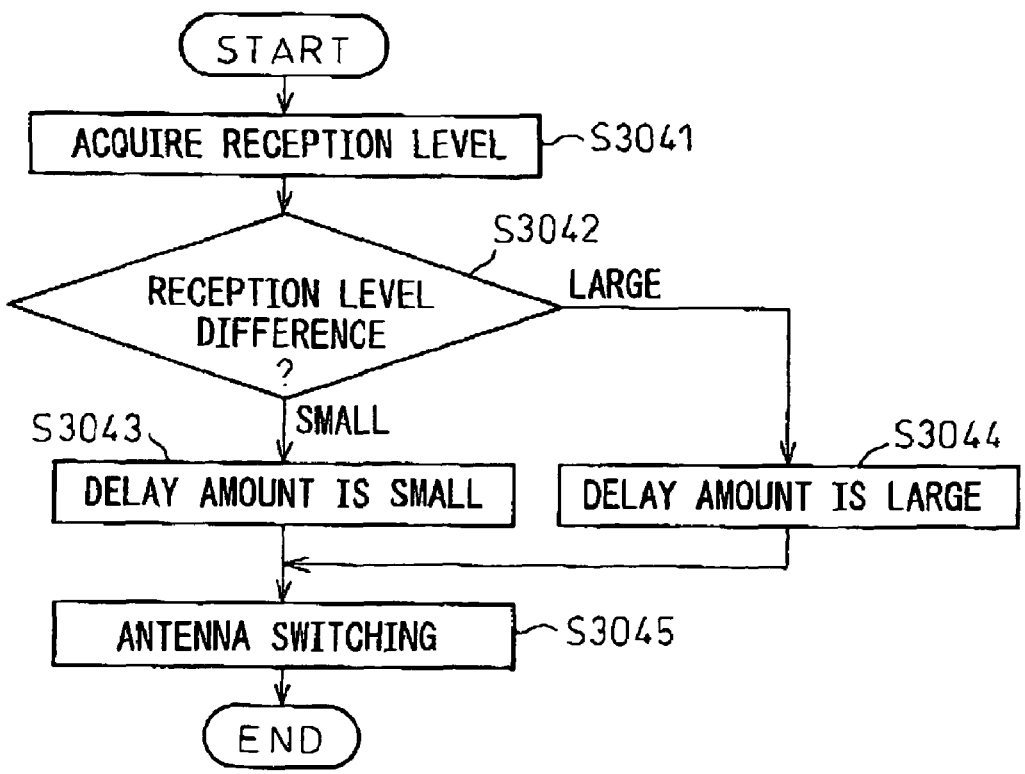
FIG. 38 is a flow chart of an example (1) of the control of FIG. 37.
Figure 39:
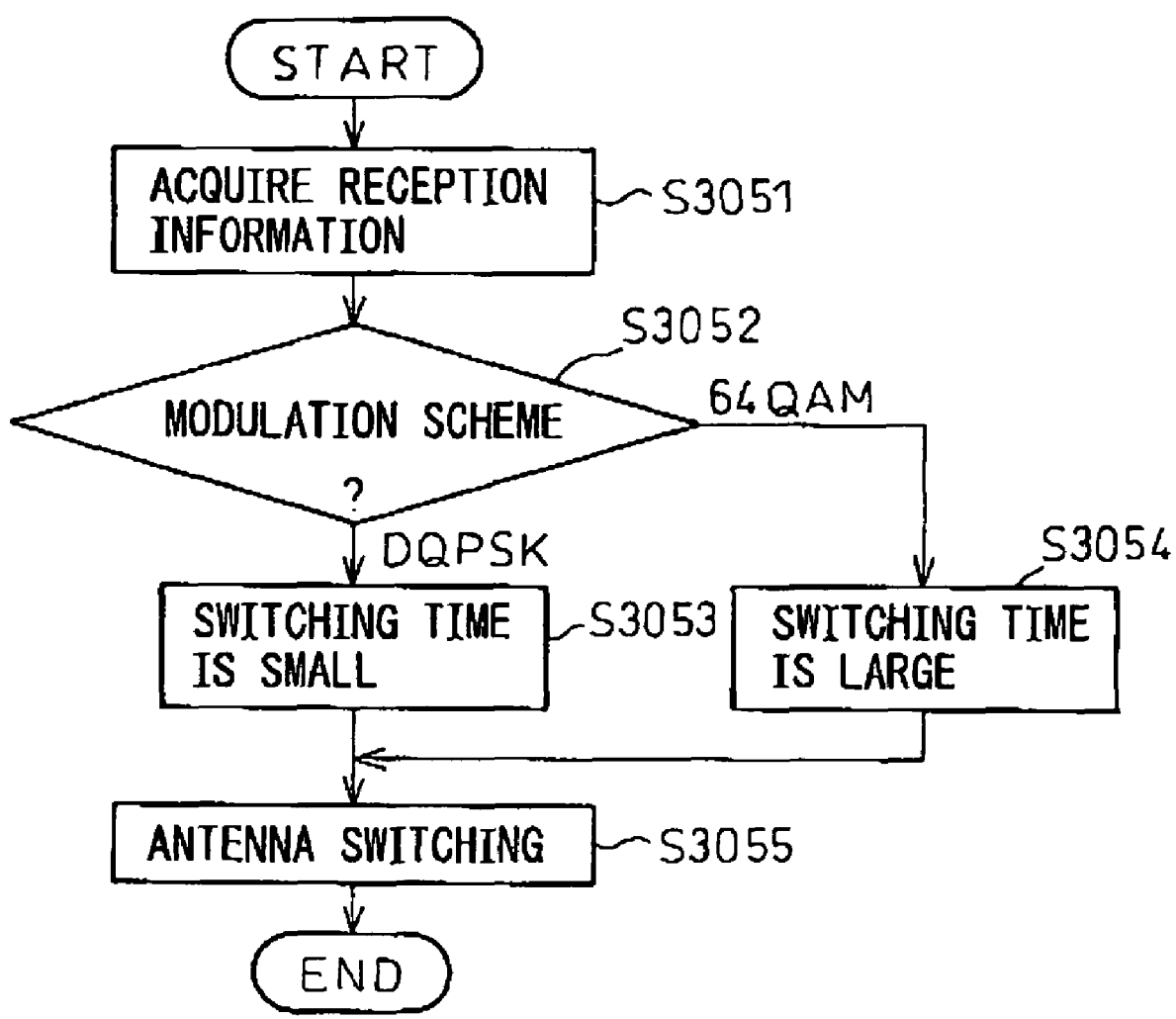
FIG. 39 is a flow chart of an example (2) of the control of FIG. 37.

FIGS. 38 and 39 show an example of the flow of control of the delay time (switching time) applied to the switching waveform (b) or (c) of FIG. 37.

FIGS. 38 and 39 correspond to FIGS. 31 and 32 concerning the 15th embodiment explained above. The delay time (switching time) determined in FIGS. 38 and 39 is used for the time delay of the reception level control of one waveform of the switching waveform (b) or (c) of FIG. 37. The parts other than this are as explained in the 15th embodiment Accordingly, they are not further explained here.

While the invention has been described with reference to specific embodiments chosen for purpose of illustration, it should be apparent that numerous modifications could be made thereto by those skilled in the art without departing from the basic concept and scope of the invention.

The invention claimed is:

1. A receiver for receiving a radio wave modulated according to a digital signal, the receiver comprising:
   a first reception unit having a first switching/combining unit for receiving a first plurality of reception signals and outputting one of the first plurality of reception signals and a combined signal of the first plurality of reception signals, wherein said first reception unit comprises a first antenna set including a plurality of directional antennas;
   a second reception unit having a second switching/combining unit for receiving a second plurality of reception signals different from said first plurality of reception signals and outputting one of the second plurality of reception signals and a combined signal of the second plurality of reception signals, wherein said second reception unit comprises a second antenna set including a plurality of directional antennas; and
   a switching/combining control unit for controlling said first switching/combining unit and said second switching/combining unit to switch to and combine one or more of the first and second plurality of reception signals, in accordance with a first signal reception condition in said first reception unit and a second signal reception condition in said second reception unit, wherein
   said first antenna set comprises a first front directional antenna, a first side directional antenna and a first rear directional antenna, and wherein
   said second antenna set comprises a second front directional antenna, a second side antenna and a second rear directional antenna.

2. The receiver according to claim 1, further comprising:
   a diversity processing unit for diversity processing output signals from said first reception unit and said second reception unit, wherein
   said switching/combining control unit controls said first switching/combining unit and said second switching/combining unit in accordance with a receiving condition in the diversity processing unit.

3. The receiver according to claim 1, wherein
   said first antenna set comprises a first front directional antenna and a first rear directional antenna, and wherein
   said second antenna set comprises a second front directional antenna and a second rear directional antenna.

4. A receiver for receiving a radio wave modulated according to a digital signal, the receiver comprising:
   a selection unit for selecting at least one of a plurality of reception signals;
   a control unit for controlling the selection unit in accordance with a receiving condition of a selected reception signal selected by the selection unit, wherein said control unit selects a reception signal having a reception level not more than a predetermined level when a state of reception of the selected reception signal is determined to be deteriorated;
   an antenna group having a plurality of antennas, wherein said control unit selects the reception signal by selecting at least one antenna in the antenna group providing a reception level of not more than said predetermined level, wherein said antenna group comprises a nondirectional antenna and a plurality of directional antenna, and wherein said control unit acquires the reception level of the reception signal received at the nondirectional antenna when judging that the reception signal, received at the time of selection of said nondirectional antenna, is deteriorated in receiving condition, and selects a directional antenna providing a reception level of not more than said predetermined level when the acquired reception level is larger than said predetermined level.

5. The receiver according to claim 4, wherein said control unit acquires the reception level of the reception signal received at the selected antenna when judging that the reception signal received at the antenna selected by said selection unit is deteriorated in receiving condition and selects an antenna providing a reception level of not more than the predetermined level when the acquired reception level is larger than the predetermined reference level.

6. A receiver for receiving a radio wave modulated according to a digital signal, the receiver comprising:
- a selection unit for selecting at least one of a plurality of reception signals;
- a control unit for controlling the selection unit in accordance with a receiving condition of a selected reception signal selected by the selection unit, wherein said control unit selects a reception signal having a reception level not more than a predetermined level when a state of reception of the selected reception signal is determined to be deteriorated;
- an antenna group having a plurality of antennas, wherein said control unit selects the reception signal by selecting at least one antenna in the antenna group providing a reception level of not more than said predetermined level, wherein said antenna group comprises a plurality of directional antennas and configures a nondirectional antenna by combining the plurality of directional antennas, and wherein said control unit acquires the reception level of the reception signal received at the nondirectional antenna when judging that the reception signal received at the time of selection of said nondirectional antenna is deteriorated in receiving condition, and selects a directional antenna providing a reception level of not more than the predetermined level when the acquired reception level is larger than the predetermined level.

7. A receiver for receiving a radio wave modulated according to a digital signal, the receiver comprising:
- a selection unit for selecting at least one of a plurality of reception signals;
- a control unit for controlling the selection unit in accordance with a receiving condition of a selected reception signal selected by the selection unit, wherein said control unit selects a reception signal having a reception level not more than a predetermined level when a state of reception of the selected reception signal is determined to be deteriorated;
- an antenna group having a plurality of antennas, wherein said control unit selects the reception signal by selecting at least one antenna in the antenna group providing a reception level of not more than said predetermined level, wherein said control unit acquires the reception level of the reception signal received at the selected antenna when judging that the reception signal received at the antenna selected by said selection unit is deteriorated in receiving conditions, and selects an antenna in a reverse direction to the selected antenna when the acquired reception level is larger than the predetermined reference level.

* * * * *

UNITED STATES PATENT AND TRADEMARK OFFICE
CERTIFICATE OF CORRECTION

| | |
|---|---|
| PATENT NO. | : 7,636,593 B2 |
| APPLICATION NO. | : 11/049795 |
| DATED | : December 22, 2009 |
| INVENTOR(S) | : Nobuyuki Kurioka |

It is certified that error appears in the above-identified patent and that said Letters Patent is hereby corrected as shown below:

Column 24, Claim 7, lines 32-33     Delete "conditions,"
                                    Insert -- condition, --

Signed and Sealed this

Fifteenth Day of June, 2010

David J. Kappos
*Director of the United States Patent and Trademark Office*